(12) United States Patent
Nakagawa

(10) Patent No.: US 8,406,108 B2
(45) Date of Patent: Mar. 26, 2013

(54) OBJECTIVE LENS FOR OPTICAL PICKUP AND OPTICAL PICKUP DEVICE

(75) Inventor: Yohei Nakagawa, Neyagawa (JP)

(73) Assignee: Sanyo Electric Co., Ltd., Moriguchi-shi, Osaka (JP)

( * ) Notice: Subject to any disclaimer, the term of this patent is extended or adjusted under 35 U.S.C. 154(b) by 0 days.

(21) Appl. No.: 13/224,016

(22) Filed: Sep. 1, 2011

(65) Prior Publication Data
US 2012/0057447 A1   Mar. 8, 2012

(30) Foreign Application Priority Data

Sep. 2, 2010 (JP) ................................. 2010-196823

(51) Int. Cl.
*G11B 7/00* (2006.01)
(52) U.S. Cl. ............................... 369/112.01; 369/112.23
(58) Field of Classification Search ............. 369/112.23, 369/112.01, 44.23, 44.24, 112.1; 359/719, 359/718
See application file for complete search history.

(56) References Cited

U.S. PATENT DOCUMENTS

| | | | | |
|---|---|---|---|---|
| 3,544,198 A | * | 12/1970 | de Metz et al. | 359/719 |
| 6,876,502 B2 | * | 4/2005 | Young Sik | 359/719 |
| 7,200,098 B2 | * | 4/2007 | Yoo et al. | 369/112.23 |
| 8,116,188 B2 | * | 2/2012 | Yasui | 369/112.23 |

FOREIGN PATENT DOCUMENTS

| | | |
|---|---|---|
| JP | 2001-324673 A | 11/2001 |
| WO | WO 2010/116829 | * 10/2010 |

* cited by examiner

*Primary Examiner* — Nabil Hindi
(74) *Attorney, Agent, or Firm* — Ditthavong Mori & Steiner, P.C.

(57) ABSTRACT

An objective lens for an optical pickup device is provided with a light-source-side lens surface by which laser light is converged, and a disc-side lens surface by which the laser light converged by the light-source-side lens surface is converged. The first lens surface and the second lens surface are configured to guide a part of a light collecting portion of the laser light reflected on the second lens surface to a position on an outside of the first lens surface.

16 Claims, 15 Drawing Sheets

FIG. 6

EXAMPLE 1

|   | Conic | A4 | A6 | A8 | A10 | A12 | A14 | A16 |
|---|---|---|---|---|---|---|---|---|
| 3 | -1.07171E+00 | 8.53602E-02 | 3.99550E-02 | -5.15809E-02 | 1.05023E-01 | -8.32892E-02 | 3.19525E-02 | -2.55450E-03 |
| 4 | 5.97482E+00 | 2.55792E-01 | -2.61453E-01 | 1.66656E-01 | -3.09136E-03 | -7.97879E-02 | 5.12453E-02 | -1.04828E-02 |

EXAMPLE 2

|   | Conic | A4 | A6 | A8 | A10 | A12 | A14 | A16 |
|---|---|---|---|---|---|---|---|---|
| 3 | -1.07466E+00 | 8.44597E-02 | 3.75519E-02 | -4.37143E-02 | 1.03359E-01 | -9.58176E-02 | 4.90558E-02 | -9.40083E-03 |
| 4 | 0.00000E+00 | 3.47196E-01 | -3.81203E-01 | 2.07663E-01 | 2.80268E-02 | -1.25108E-01 | 7.64037E-02 | -1.62240E-02 |

EXAMPLE 3

|   | Conic | A4 | A6 | A8 | A10 | A12 | A14 | A16 |
|---|---|---|---|---|---|---|---|---|
| 3 | -1.22159E+00 | 1.03868E-01 | 2.82845E-02 | -4.05217E-02 | 1.06988E-01 | -1.12535E-01 | 6.63605E-02 | -1.57856E-02 |
| 4 | -2.26940E+00 | 3.40089E-01 | -2.61728E-01 | -1.92061E-01 | 6.14454E-01 | -5.99486E-01 | 2.84401E-01 | -5.65811E-02 |

EXAMPLE 4

|   | Conic | A4 | A6 | A8 | A10 | A12 | A14 | A16 |
|---|---|---|---|---|---|---|---|---|
| 3 | -1.15805E+00 | 9.41708E-02 | 2.91993E-02 | -3.84056E-02 | 1.06272E-01 | -1.16595E-01 | 7.08921E-02 | -1.74770E-02 |
| 4 | -4.35801E-01 | 4.28699E-01 | -4.51110E-01 | -2.25075E-02 | 5.98308E-01 | -6.88418E-01 | 3.51676E-01 | -7.15586E-02 |

EXAMPLE 5

|   | Conic | A4 | A6 | A8 | A10 | A12 | A14 | A16 |
|---|---|---|---|---|---|---|---|---|
| 3 | -1.10026E+00 | 8.52695E-02 | 3.03966E-02 | -3.89127E-02 | 1.05562E-01 | -1.15800E-01 | 7.03086E-02 | -1.73380E-02 |
| 4 | -3.32998E+01 | 3.81520E-01 | -4.92396E-01 | 3.77156E-02 | 6.03792E-01 | -7.31447E-01 | 3.69167E-01 | -7.08359E-02 |

EXAMPLE 6

|   | Conic | A4 | A6 | A8 | A10 | A12 | A14 | A16 |
|---|---|---|---|---|---|---|---|---|
| 3 | -8.15124E-01 | 4.36432E-02 | 5.87270E-02 | -1.51066E-01 | 3.16228E-01 | -3.36548E-01 | 1.87220E-01 | -4.20302E-02 |
| 4 | 1.92009E+00 | 9.03151E-01 | -2.69921E+00 | 6.63817E+00 | -1.18471E+01 | 1.34244E+01 | -8.47652E+00 | 2.25997E+00 |

EXAMPLE 7

|   | Conic | A4 | A6 | A8 | A10 | A12 | A14 | A16 |
|---|---|---|---|---|---|---|---|---|
| 3 | -8.48577E-01 | 4.62678E-02 | 4.55289E-02 | -1.06923E-01 | 2.30186E-01 | -2.46206E-01 | 1.38928E-01 | -3.21190E-02 |
| 4 | 1.15767E+00 | 1.06379E+00 | -2.98032E+00 | 6.49987E+00 | -1.11122E+01 | 1.32393E+01 | -9.28521E+00 | 2.81833E+00 |

EXAMPLE 8

|   | Conic | A4 | A6 | A8 | A10 | A12 | A14 | A16 |
|---|---|---|---|---|---|---|---|---|
| 3 | -8.51986E-01 | 4.17564E-02 | 4.05261E-02 | -1.01874E-01 | 2.15831E-01 | -2.33547E-01 | 1.35507E-01 | -3.22290E-02 |
| 4 | 2.02989E+00 | 1.30663E+00 | -3.74095E+00 | 7.66173E+00 | -1.11993E+01 | 1.17040E+01 | -7.69245E+00 | 2.40112E+00 |

FIG. 7

| EXAMPLE 9 | Conic | A4 | A6 | A8 | A10 | A12 | A14 | A16 |
|---|---|---|---|---|---|---|---|---|
| 3 | -5.30751E-01 | 6.41413E-03 | 6.18254E-04 | -4.13978E-03 | 4.35555E-03 | 0.00000E+00 | 0.00000E+00 | 0.00000E+00 |
| 4 | -5.56298E+01 | 9.24726E-02 | -5.33116E-02 | 1.73297E-02 | -2.37699E-03 | 0.00000E+00 | 0.00000E+00 | 0.00000E+00 |

| EXAMPLE 10 | Conic | A4 | A6 | A8 | A10 | A12 | A14 | A16 |
|---|---|---|---|---|---|---|---|---|
| 3 | -1.05773E+00 | 9.20348E-02 | 2.34849E-02 | 1.06665E-02 | 6.53377E-03 | 2.17793E-03 | 1.91854E-04 | 3.29051E-04 |
| 4 | -1.90237E+01 | 2.48521E-01 | -2.79034E-01 | 1.73302E-01 | -5.07903E-02 | -2.57810E-03 | 5.68153E-03 | -1.05266E-03 |

| EXAMPLE 11 | Conic | A4 | A6 | A8 | A10 | A12 | A14 | A16 |
|---|---|---|---|---|---|---|---|---|
| 3 | -1.02319E+00 | 8.61470E-02 | 7.19976E-03 | 6.62157E-02 | -9.42376E-02 | 1.00749E-01 | -4.87545E-02 | 9.59199E-03 |
| 4 | -1.03263E+01 | 3.82903E-01 | -4.94033E-01 | 2.99882E-01 | -2.23714E-03 | -1.14705E-01 | 6.53064E-02 | -1.21004E-02 |

| EXAMPLE 12 | Conic | A4 | A6 | A8 | A10 | A12 | A14 | A16 |
|---|---|---|---|---|---|---|---|---|
| 3 | -9.76916E-01 | 8.00892E-02 | 1.61789E-03 | 8.25217E-02 | -1.13974E-01 | 1.06084E-01 | -4.38872E-02 | 6.72466E-03 |
| 4 | -2.06659E+01 | 3.34146E-01 | -4.76177E-01 | 3.24749E-01 | -3.88393E-02 | -9.51256E-02 | 6.11845E-02 | -1.20079E-02 |

| EXAMPLE 13 | Conic | A4 | A6 | A8 | A10 | A12 | A14 | A16 |
|---|---|---|---|---|---|---|---|---|
| 3 | -9.85776E-01 | 8.11019E-02 | 1.63363E-02 | 4.41111E-02 | -7.30250E-02 | 9.76426E-02 | -6.06892E-02 | 1.62695E-02 |
| 4 | -2.95287E+01 | 2.81382E-01 | -4.18270E-01 | 3.49949E-01 | -8.29091E-02 | -1.11611E-01 | 9.65810E-02 | -2.33154E-02 |

| EXAMPLE 14 | Conic | A4 | A6 | A8 | A10 | A12 | A14 | A16 |
|---|---|---|---|---|---|---|---|---|
| 3 | -9.11898E-01 | 8.88901E-02 | -1.27964E-02 | 9.33500E-02 | -1.41240E-01 | 1.60070E-01 | -9.34576E-02 | 2.51441E-02 |
| 4 | -7.75577E+01 | 1.48241E-01 | -1.00602E-01 | 6.92640E-02 | -8.42562E-02 | 6.45813E-02 | -2.18772E-02 | 2.34619E-03 |

| EXAMPLE 15 | Conic | A4 | A6 | A8 | A10 | A12 | A14 | A16 |
|---|---|---|---|---|---|---|---|---|
| 3 | -9.85588E-01 | 8.16749E-02 | 1.31619E-02 | 5.04255E-02 | -8.91349E-02 | 9.77567E-02 | -5.65285E-02 | 1.44374E-02 |
| 4 | -3.24176E+01 | 2.80861E-01 | -4.15027E-01 | 3.46748E-01 | -8.38678E-02 | -1.15368E-01 | 1.04316E-01 | -2.64714E-02 |

| EXAMPLE 16 | Conic | A4 | A6 | A8 | A10 | A12 | A14 | A16 |
|---|---|---|---|---|---|---|---|---|
| 3 | -9.82879E-01 | 8.10553E-02 | 8.35644E-03 | 5.84526E-02 | -8.91349E-02 | 9.82604E-02 | -5.17708E-02 | 1.23501E-02 |
| 4 | -3.30871E+01 | 3.00173E-01 | -4.22041E-01 | 3.07534E-01 | -2.90717E-02 | -1.41018E-01 | 1.04862E-01 | -2.43322E-02 |

| EXAMPLE 17 | Conic | A4 | A6 | A8 | A10 | A12 | A14 | A16 |
|---|---|---|---|---|---|---|---|---|
| 3 | -9.83339E-01 | 8.14952E-02 | 7.51214E-03 | 5.68496E-02 | -8.30086E-02 | 8.83266E-02 | -4.40873E-02 | 1.00798E-02 |
| 4 | -3.34797E+01 | 3.52899E-01 | -5.15230E-01 | 3.08454E-01 | 9.40155E-02 | -1.92267E-01 | 1.76236E-02 | 3.72137E-02 |

| EXAMPLE 18 | Conic | A4 | A6 | A8 | A10 | A12 | A14 | A16 |
|---|---|---|---|---|---|---|---|---|
| 3 | -1.00481E+00 | 8.26394E-02 | 7.99993E-03 | 5.37764E-02 | -7.78967E-02 | 8.20061E-02 | -4.07647E-02 | 9.25391E-03 |
| 4 | -3.12924E+01 | 4.74888E-01 | -8.67358E-01 | 6.12601E-01 | 4.69479E-01 | -1.16587E+00 | 6.74288E-01 | -7.32854E-02 |

FIG. 8

| EXAMPLE 19 | Conic | A4 | A6 | A8 | A10 | A12 | A14 | A16 |
|---|---|---|---|---|---|---|---|---|
| 3 | -1.08775E+00 | 8.48805E-02 | 4.29673E-02 | -5.44266E-02 | 1.01374E-01 | -7.74119E-02 | 2.50784E-02 | 4.16357E-04 |
| 4 | 7.99285E+00 | 1.93904E-01 | -2.51496E-01 | 1.84319E-01 | -9.12607E-03 | -7.98318E-02 | 4.83764E-02 | -9.09058E-03 |

| EXAMPLE 20 | Conic | A4 | A6 | A8 | A10 | A12 | A14 | A16 |
|---|---|---|---|---|---|---|---|---|
| 3 | -1.10885E+00 | 8.56386E-02 | 3.35627E-02 | -3.68346E-02 | 8.49754E-02 | -7.69957E-02 | 3.53268E-02 | -4.55648E-03 |
| 4 | -8.13499E+00 | 1.93740E-01 | -2.43943E-01 | 1.94720E-01 | -1.70040E-02 | -1.09276E-01 | 8.10040E-02 | -1.83916E-02 |

| EXAMPLE 21 | Conic | A4 | A6 | A8 | A10 | A12 | A14 | A16 |
|---|---|---|---|---|---|---|---|---|
| 3 | -1.10256E+00 | 8.39810E-02 | 3.43467E-02 | -3.45636E-02 | 7.57239E-02 | -6.32751E-02 | 2.71380E-02 | -3.10043E-03 |
| 4 | -9.51929E+00 | 2.20340E-01 | -2.76231E-01 | 2.12143E-01 | -2.46140E-02 | -1.08144E-01 | 8.40731E-02 | -1.99507E-02 |

| EXAMPLE 22 | Conic | A4 | A6 | A8 | A10 | A12 | A14 | A16 |
|---|---|---|---|---|---|---|---|---|
| 3 | -1.09886E+00 | 8.20642E-02 | 3.17397E-02 | -3.55914E-02 | 8.12627E-02 | -7.34029E-02 | 3.51933E-02 | -5.42923E-03 |
| 4 | 9.16112E+00 | 1.96450E-01 | -2.30463E-01 | 1.95916E-01 | -4.62112E-02 | -1.02453E-01 | 9.91293E-02 | -2.72187E-02 |

| EXAMPLE 23 | Conic | A4 | A6 | A8 | A10 | A12 | A14 | A16 |
|---|---|---|---|---|---|---|---|---|
| 3 | -1.08373E+00 | 7.85978E-02 | 2.77967E-02 | -2.83849E-02 | 7.26565E-02 | -7.09126E-02 | 3.83904E-02 | -7.65160E-03 |
| 4 | 8.01572E+00 | 2.15409E-01 | -2.21870E-01 | 1.81979E-01 | -1.50160E-01 | 7.51815E-02 | -1.83843E-02 | -8.66474E-03 |

| EXAMPLE 24 | Conic | A4 | A6 | A8 | A10 | A12 | A14 | A16 |
|---|---|---|---|---|---|---|---|---|
| 3 | -1.08805E+00 | 7.75083E-02 | 2.58763E-02 | -2.88285E-02 | 7.22462E-02 | -7.11131E-02 | 3.83606E-02 | -7.58872E-03 |
| 4 | -1.26120E+02 | 2.27763E-01 | -2.25993E-01 | 1.74574E-01 | -1.54327E-01 | 7.79775E-02 | 5.49224E-03 | -1.16593E-02 |

| EXAMPLE 25 | Conic | A4 | A6 | A8 | A10 | A12 | A14 | A16 |
|---|---|---|---|---|---|---|---|---|
| 3 | -1.07880E+00 | 7.45918E-02 | 2.43510E-02 | -2.41887E-02 | 6.67395E-02 | -7.00251E-02 | 4.08405E-02 | -9.39972E-03 |
| 4 | -1.16872E+01 | 3.51124E-01 | -4.09797E-01 | 1.19997E-01 | 2.16165E-01 | 2.16121E-01 | -3.04954E-01 | 1.07827E-01 |

| EXAMPLE 26 | Conic | A4 | A6 | A8 | A10 | A12 | A14 | A16 |
|---|---|---|---|---|---|---|---|---|
| 3 | -1.08724E+00 | 7.34617E-02 | 2.28476E-02 | -2.47111E-02 | 6.63108E-02 | -7.00027E-02 | 4.09265E-02 | -9.44337E-03 |
| 4 | -1.51225E+02 | 3.82775E-01 | -4.71064E-01 | 6.64062E-02 | 4.82238E-02 | 3.46808E-01 | -1.83054E-01 | -1.60495E-01 |

FIG. 9A

Material : AD5503

| nh | vd | Example | center thickness (mm) | d/f | light collecting rate (S1/S2) | light resistance | ratio of light non-collecting area (S3/S2) | d' | degradation of center portion | thickness difference ratio (inverse number) | Nh*d/f |
|---|---|---|---|---|---|---|---|---|---|---|---|
| 1.61628 | 30.18 | 8 | 1.900 | 1.349 | 2.82 | × | 0% | 0.87 | × | 1.883 | 2.18106 |
| | | 7 | 1.800 | 1.278 | 2.79 | × | 0% | 1.09 | × | 2.151 | 2.066267 |
| | | 6 | 1.700 | 1.207 | 2.41 | × | 0% | 1.26 | × | 2.408 | 1.951474 |
| | | 5 | 1.600 | 1.136 | 2.08 | × | 0% | 1.49 | × | 2.762 | 1.836682 |
| | | 4 | 1.550 | 1.101 | 1.92 | ○ | 3% | 1.58 | △ | 2.979 | 1.779286 |
| | | 3 | 1.500 | 1.065 | 1.79 | ○ | 14% | 1.72 | ○ | 3.268 | 1.721889 |
| | | 2 | 1.400 | 0.994 | 1.56 | ◎ | 32% | 2.16 | ○ | 4.282 | 1.607097 |
| | | 1 | 1.300 | 0.923 | 1.35 | ◎ | 44% | 2.53 | ○ | 6.060 | 1.492304 |

FIG. 9B

Material : E48R

| nh | vd | Example | center thickness (mm) | d/f | light collecting rate (S1/S2) | light resistance | ratio of light non-collecting area (S3/S2) | d' | degradation of center portion | thickness difference ratio (inverse number) | Nh*d/f |
|---|---|---|---|---|---|---|---|---|---|---|---|
| 1.54657 | 55.73 | 18 | 1.900 | 1.349 | 3.02 | × | 0% | 1.10 | × | 2.338 | 2.086987 |
| | | 17 | 1.800 | 1.278 | 2.48 | × | 0% | 1.30 | × | 2.762 | 1.977145 |
| | | 16 | 1.700 | 1.207 | 2.07 | × | 0% | 1.42 | × | 2.967 | 1.867304 |
| | | 15 | 1.600 | 1.136 | 1.75 | ○ | 0% | 1.61 | × | 3.501 | 1.757463 |
| | | 14 | 1.550 | 1.101 | 1.59 | ○ | 0% | 1.50 | △ | 3.679 | 1.702542 |
| | | 13 | 1.550 | 1.101 | 1.61 | ○ | 4% | 1.66 | ○ | 3.881 | 1.702542 |
| | | 12 | 1.550 | 1.101 | 1.63 | ◎ | 10% | 1.80 | △ | 4.105 | 1.702542 |
| | | 11 | 1.500 | 1.065 | 1.48 | ◎ | 6% | 1.63 | ○ | 4.256 | 1.647621 |
| | | 10 | 1.400 | 0.994 | 1.28 | ◎ | 18% | 1.83 | ○ | 5.982 | 1.53778 |
| | | 9 | 1.300 | 0.923 | 1.12 | ○ | 29% | 2.21 | ○ | 10.698 | 1.427938 |

FIG. 9C

Material : OKP4HT

| nh | vd | Example | center thickness (mm) | d/f | light collecting rate (S1/S2) | light resistance | ratio of light non-collecting area (S3/S2) | d' | degradation of center portion | thickness difference ratio (inverse number) | Nh*d/f |
|---|---|---|---|---|---|---|---|---|---|---|---|
| 1.7033 | 23.42 | 26 | 1.700 | 1.207 | 3.11 | × | 0% | 1.62 | × | 2.155 | 2.056541 |
| | | 25 | 1.600 | 1.136 | 2.61 | × | 16% | 1.88 | △ | 2.357 | 1.935568 |
| | | 24 | 1.500 | 1.065 | 2.23 | × | 32% | 2.34 | △ | 2.653 | 1.814595 |
| | | 23 | 1.400 | 0.994 | 1.89 | × | 52% | 2.72 | ○ | 3.047 | 1.693622 |
| | | 22 | 1.300 | 0.923 | 1.63 | △ | 72% | 3.38 | ○ | 3.684 | 1.572649 |
| | | 21 | 1.250 | 0.888 | 1.51 | △ | 84% | 3.71 | ○ | 4.150 | 1.512163 |
| | | 20 | 1.200 | 0.852 | 1.41 | ○ | 95% | 4.06 | ○ | 4.781 | 1.451676 |
| | | 19 | 1.100 | 0.781 | 1.22 | ○ | 100% | 5.09 | ○ | 7.358 | 1.330703 |

OBJECTIVE LENS FOR OPTICAL PICKUP AND OPTICAL PICKUP DEVICE

This application claims priority under 35 U.S.C. Section 119 of Japanese Patent Application No. 2010-196823 filed Sep. 2, 2010, entitled "OBJECTIVE LENS FOR OPTICAL PICKUP AND OPTICAL PICKUP DEVICE". The disclosure of the above application is incorporated herein by reference.

BACKGROUND OF THE INVENTION

1. Field of the Invention

The present invention relates to an objective lens for an optical pickup, and an optical pickup device loaded with the objective lens; and more particularly to a resin objective lens which converges laser light in a blue wavelength region on a disc, and an optical pickup device loaded with the objective lens.

2. Disclosure of Related Art

In recent years, a resin objective lens is loaded in an optical pickup device. Since the resin objective lens is lightweight as compared with a glass objective lens, it is possible to enhance the driving response of the objective lens. Further, since the resin objective lens is inexpensive, it is possible to reduce the cost of an apparatus.

Japanese Unexamined Patent Publication No. 2001-324673 discloses an objective lens having a numerical aperture of 0.75 or more, and suitable for use of laser light having a wavelength of or about 400 nm. Such an objective lens is designed to satisfy a condition: $1.1 \leq d1/f \leq 3$ (where d1 is an on-axis lens thickness, and f is a focal length).

However, if laser light of a wavelength of or about 400 nm is entered into a resin objective lens, the objective lens may be degraded by the laser light. In particular, a resin material to be used for an objective lens is likely to absorb light in a wavelength region of or about 400 nm. As a result, the objective lens may be degraded, which may lower the optical characteristics such as light transmittance.

SUMMARY OF THE INVENTION

A first aspect of the invention relates to an objective lens for an optical pickup device. The objective lens for an optical pickup device according to the first aspect includes a first lens surface by which laser light is converged, and a second lens surface by which the laser light converged by the first lens surface is converged. The first lens surface and the second lens surface are configured to guide a part of a light collecting portion of the laser light reflected by the second lens surface to a position on an outside of the first lens surface.

A second aspect of the invention relates to an optical pickup device. The optical pickup device according to the second aspect is loaded in the objective lens according to the first aspect.

BRIEF DESCRIPTION OF THE DRAWINGS

These and other objects, and novel features of the present invention will become more apparent upon reading the following detailed description of the embodiment along with the accompanying drawings.

FIG. 1A is a side view of the objective lens, FIG. 1B is a plan view of the objective lens when viewed from above (from the side of a light source), and FIG. 1C is a plan view of the objective lens when viewed from below (from the side of a disc).

FIG. 4A is a diagram schematically showing a state of reflected light, in the case where the surface configurations of a light-source-side lens surface and a disc-side lens surface are designed in accordance with a predetermined relational expression. FIG. 4B is a diagram showing a state of the disc-side lens surface when viewed in an optical axis direction.

FIG. 6 is a diagram showing design values of configurations of lens surfaces of objective lenses in examples.

FIG. 7 is a diagram showing design values of configurations of lens surfaces of objective lenses in examples.

FIG. 8 is a diagram showing design values of configurations of lens surfaces of objective lenses in examples.

FIGS. 9A through 9C are diagrams showing test results in the respective examples. FIG. 9A shows a test result of a group wherein an objective lens is made of material AD5503, FIG. 9B shows a test result of a group wherein an objective lens is made of material E48R, and FIG. 9C shows a test result of a group wherein an objective lens is made of material OKP4HT.

FIG. 12A is a diagram schematically showing a state that an anti-reflection film is formed on a disc-side lens surface. FIG. 12B is a diagram showing a state of the disc-side lens surface when viewed from the optical axis direction.

Figure 1A:
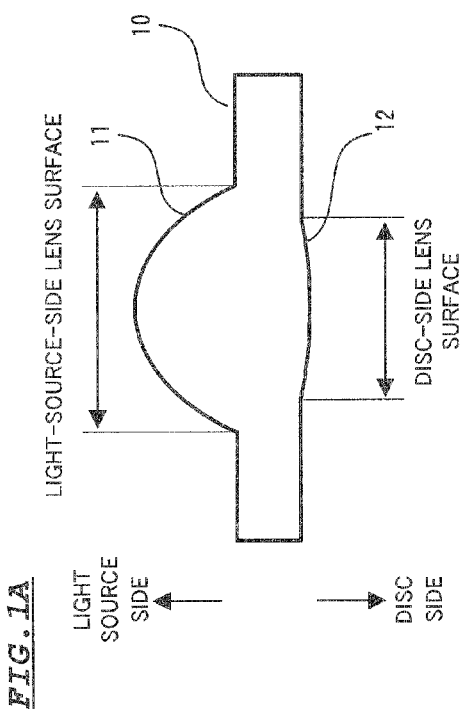
FIGS. 1A through 1C are diagrams showing an arrangement of an objective lens embodying the invention.

The drawings are provided mainly for describing the present invention, and do not limit the scope of the present invention.

DESCRIPTION OF PREFERRED EMBODIMENTS

In the following, an embodiment of the invention is described referring to the drawings. This embodiment is an example, wherein the invention is applied to an objective lens and an optical pickup device for a Blu-ray Disc (BD).

Figure 1B:
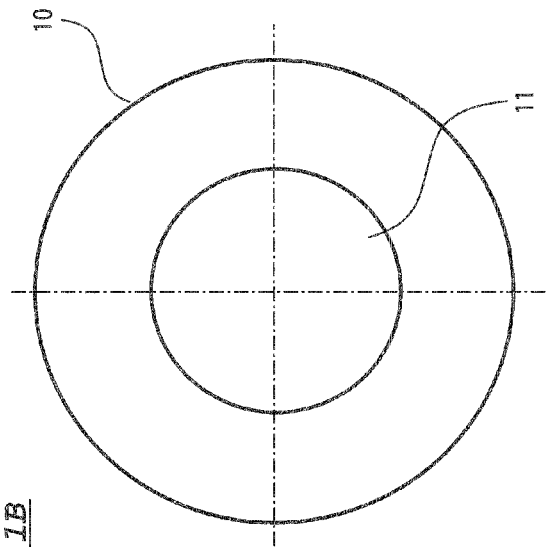
Figure 1C:
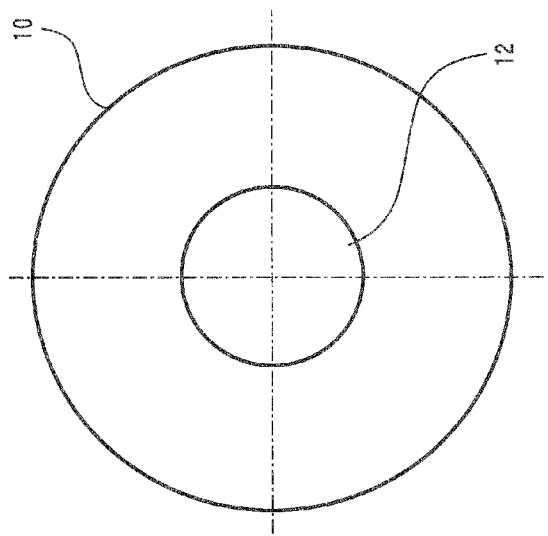

FIGS. 1A through 1C are diagrams showing an arrangement of an objective lens 10. FIG. 1A is a side view of the objective lens 10, FIG. 1B is a plan view of the objective lens when viewed from above (from the side of a light source), and FIG. 1C is a plan view of the objective lens 10 when viewed from below (from the side of a disc).

As shown in FIGS. 1A through 1C, the objective lens 10 has lens surfaces 11, 12 respectively projecting upward and downward. Hereinafter, the upper-side lens surface is called as the light-source-side lens surface 11, and the lower-side lens surface is called as the disc-side lens surface 12.

The light-source-side lens surface 11 corresponds to a first lens surface in the claims, and the disc-side lens surface corresponds to a second lens surface in the claims, respectively.

The light-source-side lens surface 11 has a curvature larger than that of the disc-side lens surface 12. Further, the projection area (S1) of the light-source-side lens surface 11 is set larger than the projection area (S2) of the disc-side lens surface 12, when viewed from the optical axis direction.

In this embodiment, the sizes of the light-source-side lens surface 11 and the disc-side lens surface 12 are designed to satisfy a condition: $S1/S2 \leq 2.0$, based on an experiment result to be described later. With this arrangement, it is possible to suppress degradation of the disc-side lens surface 12 by BD laser light (hereinafter, called as "BD light").

The objective lens in the embodiment is made of a resin material having a high light transmittance. Examples of the resin material are polycarbonate resin manufactured by Teijin Chemicals Ltd. (product name: AD5503), cycloolefin resin manufactured by ZEON CORPORATION. (product name: E48R), and polyester resin manufactured by Osaka Gas Chemical Co., Ltd. (product name: OKP4HT). The parameters of these materials are as follows.

TABLE 1

| AD5503 | Polycarbonate Resin Manufactured by Teijin Chemicals Ltd. | |
|---|---|---|
| 25° C. | Nd (Refractive Index) | 1.5825 |
| | Vd (Abbe Number) | 30.18 |
| | Linear Expansion Coefficient(cm/cm/° C.) | 0.0007 |
| | Temperature Dependence of Refractive Index Do | −0.0002291 |
| 35° C. | Refractive Index (wavelength λ: 405.6 nm) | 1.616324 |

TABLE 2

| E48R | Cycloolefin Resin Manufactured by ZEON CORPORATION | |
|---|---|---|
| 25° C. | Nd (Refractive Index) | 1.5311 |
| | Vd (Abbe Number) | 55.73 |
| | Linear Expansion Coefficient(cm/cm/° C) | 0.0006 |
| | Temperature Dependence of Refractive Index Do | −0.0002164 |
| 35° C. | Refractive Index (wavelength λ: 405.6 nm) | 1.546567 |

TABLE 3

| OKP4HT | Polyester Resin Manufactured by Osaka Gas Chemical Co., Ltd. | |
|---|---|---|
| 25° C. | Nd (Refractive Index) | 1.631919 |
| | Vd (Abbe Number) | 23.4161 |
| | Linear Expansion Coefficient(cm/cm/° C) | 0.0007 |
| | Temperature Dependence of Refractive Index Do | −0.000175 |
| 35° C. | Refractive Index (wavelength λ: 405.6 nm) | 1.703291 |

In this embodiment, the objective lens 10 is formed by injection molding or press molding. In the case of injection molding, for instance, molten resin is injected through a gate into a cavity between upper and lower molds, and the injected resin and the upper and lower molds are cooled. Thereafter, the upper and lower molds are released from each other, and an objective lens is taken out. In the case of press molding, a deformable lens intermediate body is pressed by upper and lower molds while being heated, and the pressed lens intermediate body and upper and lower molds are cooled. Thereafter, the upper and lower molds are released from each other, and an objective lens is taken out.

In the injection molding and the press molding, the upper and lower molds are formed with transferred surfaces having configurations corresponding to those of the respective lens surfaces of the objective lens. The transfer precision of a transferred surface with respect to the objective lens 10 is higher in the press molding than in the injection molding.

Figure 2:
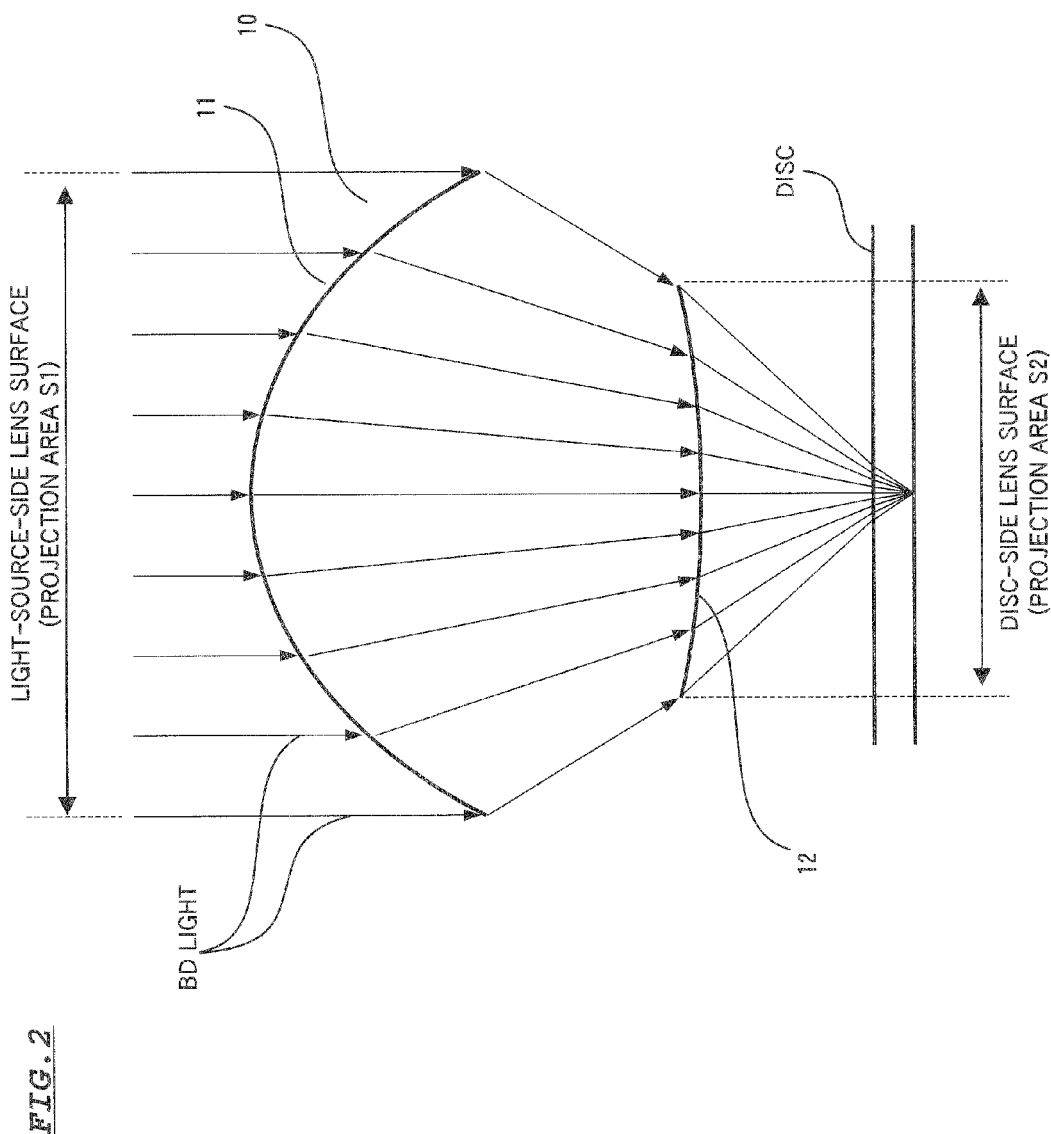
FIG. 2 is a diagram showing convergence of light on the objective lens in the embodiment.

FIG. 2 is a diagram schematically showing convergence of BD laser light by the objective lens 10 in the embodiment. In FIG. 2, only parts of the light-source-side lens surface 11 and the disc-side lens surface 12 in the side view diagram of the objective lens 10 are shown.

As shown in FIG. 2, in this embodiment, BD light is entered into the objective lens 10 as parallel light. The wavelength of BD light is about 405 nm. BD light entered into the light-source-side lens surface 11 is refracted on the light-source-side lens surface 11 in a direction toward the optical axis, and is directed toward the disc-side lens surface 12. Light rays entered into an outermost periphery (edge) of the light-source-side lens surface 11 are entered into an outermost periphery (edge) of the disc-side lens surface 12. BD light entered into the disc-side lens surface 12 is refracted on the disc-side lens surface 12 in a direction toward the optical axis. BD light converged by the objective lens 10 as described above is entered into BD with a numerical aperture suitable for BD. Thereafter, BD light is refracted on a cover layer of BD, and is focused on a recording layer.

As shown in FIG. 2, since the objective lens 10 is configured such that BD light is entered into the disc-side lens surface 12, after having been converged on the light-source-side lens surface 11, the light flux density on the disc-side lens surface 12 is set higher than that on the light-source-side lens surface 11. As a result, the disc-side lens surface 12 is likely to be degraded by BD light.

In this embodiment, in order to suppress such a degradation, the light-source-side lens surface 11 and the disc-side lens surface 12 are configured such that a projection area S1 of the light-source-side lens surface 11 and a projection area S2 of the disc-side lens surface 12 satisfy the following condition: $S1/S2 \leq 2.0$.

A part of BD light passing through the objective lens 10 is reflected on the disc-side lens surface 12. The incident angle of BD light with respect to the disc-side lens surface 12 is set larger on the outer periphery of the disc-side lens surface 12 than that on the inner periphery thereof. Accordingly, reflection on the disc-side lens surface 12 is likely to occur on the outer periphery of the disc-side lens surface 12 than on the inner periphery thereof.

Figure 3:
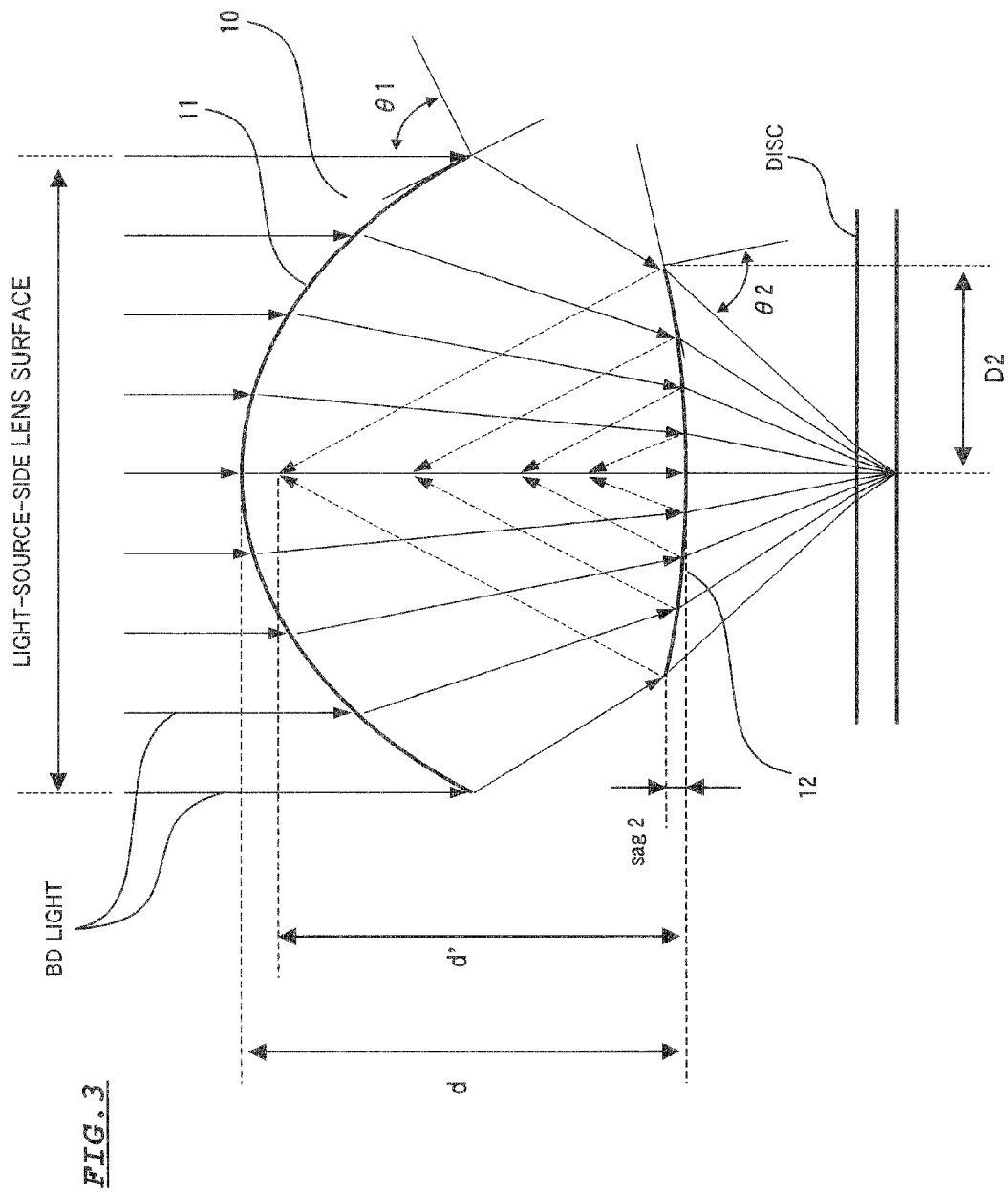
FIG. 3 is a diagram showing reflection on an output surface of the objective lens in the embodiment.

FIG. 3 is a diagram schematically showing the aforementioned reflection. In FIG. 3, the broken-line arrows indicate BD light reflected on the disc-side lens surface 12. In FIG. 3, only parts of the light-source-side lens surface 11 and the disc-side lens surface 12 are shown in the side view diagram of the objective lens 10.

As shown in FIG. 3, BD light reflected on the disc-side lens surface 12 is collected on the optical axis of the objective lens 10. As a result, a light flux intensity of BD light is increased on the optical axis of the objective lens 10. Although the light amount of BD light reflected on the disc-side lens surface 12 is relatively small, once reflection light is collected as described above, the power of BD light on a light collecting portion is increased. As a result, degradation is likely to occur on the optical axis in the objective lens 10. Thus, a pillar-shaped degraded area is likely to be generated on the optical axis in the objective lens 10.

In order to solve the above drawback, in this embodiment, the surface configurations of the light-source-side lens surface 11 and the disc-side lens surface 12 are adjusted. Specifically, the surface configurations of the light-source-side lens surface 11 and the disc-side lens surface 12 are designed to satisfy the following equations (1).

$$d < D2 \cdot \tan(90 - \theta 1 + \text{Arc} \sin(\sin \theta 1/Nh) - 2 \cdot \theta 2) + sag2 \quad (1)$$

where $\theta 1$: an incident angle of a light ray of BD light on the light-source-side lens surface 11, in the case where the light ray of BD light is converged by the objective lens 10 with a predetermined numerical aperture NA1 (an inclined angle of the light-source-side lens surface 11 at a portion where the light ray is entered), $\theta 2$: an output angle of the light ray of BD light on the disc-side lens surface 12, in the case where the light ray of BD light is converged by the objective lens 10 with the numerical aperture NA1 (an inclined angle of the disc-side lens surface 12 at a portion where the light ray is outputted), Nh: a refractive index of the objective lens at a wavelength in use, D2: a radius of an entering area of the light ray on the disc-side lens surface 12, in the case where the light ray of BD light is converged by the objective lens 10 with the numerical aperture NA1, sag2: a sag amount of the disc-side lens surface 12, in the case where the light ray of BD light is converged by the objective lens 10 with the numerical aperture NA1, and d: a center thickness of the objective lens.

As shown in FIG. 3, in the case where $\theta 1$, $\theta 2$ are defined for light rays to be entered into the outermost peripheries of the respective lens surfaces, the right-side of the equation (1) represents a height d' of a light collecting area shown in FIG. 3. Specifically, by adjusting $\theta 1$, $\theta 2$ in such a manner as to satisfy the equation (1), and designing the surface configurations of the light-source-side lens surface 11 and the disc-side lens surface 12, it is possible to retract the light collecting position of BD light reflected on the outermost periphery of the disc-side lens surface 12 to a position on the outside of the light-source-side lens surface 11. As described above, the light amount of reflected light of BD light is increased at the outermost periphery of the disc-side lens surface 12. Accordingly, it is possible to effectively suppress pillar-shaped degradation in the objective lens 10 by retracting the light collecting position of BD light reflected on the outermost periphery of the disc-side lens surface 12 to a position on the outside of the light-source-side lens surface 11.

In FIG. 3, there is described a case that $\theta 1$, $\theta 2$ are defined for light rays to be entered into the outermost peripheries of the respective lens surfaces. Alternatively, $\theta 1$, $\theta 2$ may be defined for light rays to be entered into a position on the inside of the outermost peripheries of the respective lens surfaces, and the surface configurations of the light-source-side lens surface 11 and the disc-side lens surface 12 may be designed based on the equation (1). By the above designing, it is possible to retract BD light reflected on the disc-side lens surface 12 at a position on the outside of the light ray entering portion to a position on the outside of the light-source-side lens surface 11.

Figure 4B:
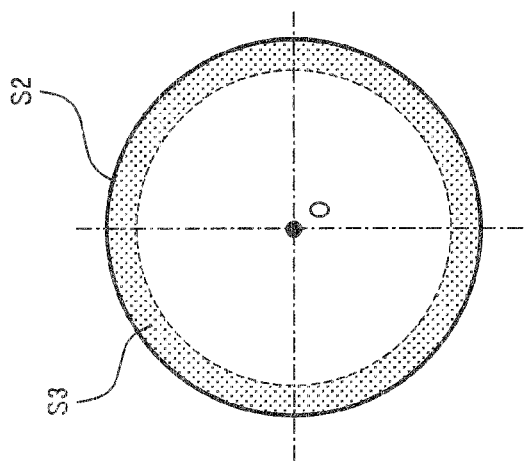
FIGS. 4A and 4B are diagrams describing a method for designing the objective lens in the embodiment.
Figure 4A:
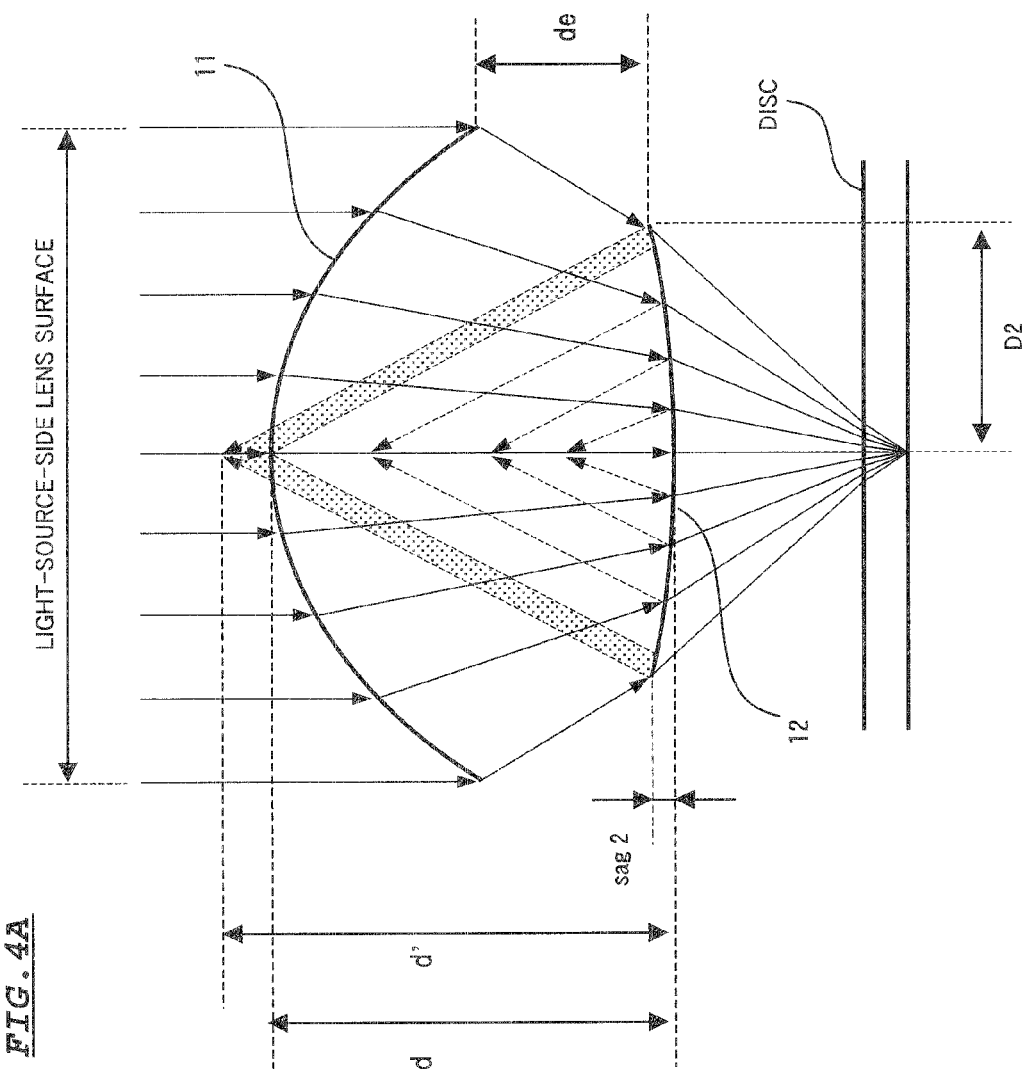

FIG. 4A is a diagram schematically showing a state of reflected light, in the case where the surface configurations of the light-source-side lens surface 11 and the disc-side lens surface 12 are designed in accordance with the equation (1). In this example, reflected light in the hatched portion is retracted to a position on the outside of the light-source-side lens surface 11.

FIG. 4B is a schematic diagram of the disc-side lens surface 12 when viewed from the optical axis direction. The hatched portion in FIG. 4B indicates an area in which light in the hatched portion shown in FIG. 4A is entered. In this example, reflected light of BD light to be entered into a projection area S3 (the hatched portion) within the projection area S2 of the disc-side lens surface 12 is retracted to a position on the outside of the light-source-side lens surface 11. By increasing the ratio of the projection area S3 to the projection area S2, it is possible to further effectively suppress the pillar-shaped degradation in the objective lens 10.

The inventor of the present application verified degradation by BD light (degradation of the disc-side lens surface 12 and pillar-shaped degradation on the optical axis resulting from an increase in the light flux density) in example of twenty-six kinds of the objective lens. In the following, a verification result is described. Twenty-six examples respectively follow the following conditions.

TABLE 4

| Example 1 | R (mm) | Thickness (mm) | Material | Semi-Diameter (mm) |
|---|---|---|---|---|
| 1 | infinity | infinity | | |
| STO | infinity | 0.0000 | | 1.200 |
| 3 | 0.94608 | 1.3000 | AD5503 | 1.200 |
| 4 | −4.99187 | 0.6163 | | 1.034 |
| 5 | infinity | 0.0875 | F8 | |
| 6 | infinity | 0.0000 | | |

| Example 2 | R (mm) | Thickness (mm) | Material | Semi-Diameter (mm) |
|---|---|---|---|---|
| 1 | infinity | infinity | | |
| STO | infinity | 0.0000 | | 1.200 |
| 3 | 0.95618 | 1.4000 | AD5503 | 1.200 |
| 4 | −4.14627 | 0.5680 | | 0.962 |
| 5 | infinity | 0.0875 | F8 | |
| 6 | infinity | 0.0000 | | |

| Example 3 | R (mm) | Thickness (mm) | Material | Semi-Diameter (mm) |
|---|---|---|---|---|
| 1 | infinity | infinity | | |
| STO | infinity | 0.0000 | | 1.200 |
| 3 | 0.95719 | 1.5000 | AD5503 | 1.200 |
| 4 | −3.73897 | 0.5127 | | 0.898 |
| 5 | infinity | 0.0875 | F8 | |
| 6 | infinity | 0.0000 | | |

| Example 4 | R (mm) | Thickness (mm) | Material | Semi-Diameter (mm) |
|---|---|---|---|---|
| 1 | infinity | infinity | | |
| STO | infinity | 0.0000 | | 1.200 |
| 3 | 0.96278 | 1.5500 | AD5503 | 1.200 |
| 4 | −3.39575 | 0.4897 | | 0.866 |
| 5 | infinity | 0.0875 | F8 | |
| 6 | infinity | 0.0000 | | |

TABLE 5

| Example 5 | R (mm) | Thickness (mm) | Material | Semi-Diameter (mm) |
|---|---|---|---|---|
| 1 | infinity | infinity | | |
| STO | infinity | 0.0000 | | 1.200 |
| 3 | 0.96796 | 1.6000 | AD5503 | 1.200 |
| 4 | −3.10002 | 0.4666 | | 0.832 |
| 5 | infinity | 0.0875 | F8 | |
| 6 | infinity | 0.0000 | | |

| Example 6 | R (mm) | Thickness (mm) | Material | Semi-Diameter (mm) |
|---|---|---|---|---|
| 1 | infinity | infinity | | |
| STO | infinity | 0.0000 | | 1.200 |
| 3 | 0.98061 | 1.7000 | AD5503 | 1.200 |
| 4 | −2.55644 | 0.4233 | | 0.773 |
| 5 | infinity | 0.0875 | F8 | |
| 6 | infinity | 0.0000 | | |

| Example 7 | R (mm) | Thickness (mm) | Material | Semi-Diameter (mm) |
|---|---|---|---|---|
| 1 | infinity | infinity | | |
| STO | infinity | 0.0000 | | 1.200 |
| 3 | 0.99232 | 1.8000 | AD5503 | 1.200 |
| 4 | −2.13198 | 0.3802 | | 0.719 |
| 5 | infinity | 0.0875 | F8 | |
| 6 | infinity | 0.0000 | | |

| Example 8 | R (mm) | Thickness (mm) | Material | Semi-Diameter (mm) |
|---|---|---|---|---|
| 1 | infinity | infinity | | |
| STO | infinity | 0.0000 | | 1.200 |
| 3 | 1.01662 | 1.9000 | AD5503 | 1.200 |
| 4 | −1.70322 | 0.3507 | | 0.729 |
| 5 | infinity | 0.0875 | F8 | |
| 6 | infinity | 0.0000 | | |

TABLE 6

| Example 9 | R (mm) | Thickness (mm) | Material | Semi-Diameter (mm) |
|---|---|---|---|---|
| 1 | infinity | infinity | | |
| STO | infinity | 0.0000 | | 1.200 |
| 3 | 0.89462 | 1.3000 | E48R | 1.200 |
| 4 | −2.67810 | 0.6310 | | 1.136 |
| 5 | infinity | 0.0875 | F8 | |
| 6 | infinity | 0.0000 | | |

| Example 10 | R (mm) | Thickness (mm) | Material | Semi-Diameter (mm) |
|---|---|---|---|---|
| 1 | | infinity | | |
| STO | | 0.0000 | | 1.200 |
| 3 | 0.89711 | 1.4000 | E48R | 1.200 |
| 4 | −2.42757 | 0.5775 | | 1.061 |
| 5 | | 0.0875 | F8 | |
| 6 | | 0.0000 | | |

| Example 11 | R (mm) | Thickness (mm) | Material | Semi-Diameter (mm) |
|---|---|---|---|---|
| 1 | | infinity | | |
| STO | | 0.0000 | | 1.200 |
| 3 | 0.90307 | 1.5000 | E48R | 1.200 |
| 4 | −2.14988 | 0.5276 | | 0.987 |
| 5 | | 0.0875 | F8 | |
| 6 | | 0.0000 | | |

| Example 12 | R (mm) | Thickness (mm) | Material | Semi-Diameter (mm) |
|---|---|---|---|---|
| 1 | | infinity | | |
| STO | | 0.0000 | | 1.200 |
| 3 | 0.90702 | 1.5500 | E48R | 1.200 |
| 4 | −2.01124 | 0.5037 | | 0.952 |
| 5 | | 0.0875 | F8 | |
| 6 | | 0.0000 | | |

| Example 13 | R (mm) | Thickness (mm) | Material | Semi-Diameter (mm) |
|---|---|---|---|---|
| 1 | | infinity | | |
| STO | | 0.0000 | | 1.200 |
| 3 | 0.90998 | 1.5500 | E48R | 1.200 |
| 4 | −1.98508 | 0.5065 | | 0.946 |
| 5 | | 0.0875 | F8 | |
| 6 | | 0.0000 | | |

TABLE 7

| Example 14 | R (mm) | Thickness (mm) | Material | Semi-Diameter (mm) |
|---|---|---|---|---|
| 1 | | infinity | | |
| STO | | 0.0000 | | 1.200 |
| 3 | 0.92746 | 1.5500 | E48R | 1.200 |
| 4 | −1.85053 | 0.5225 | | 0.939 |
| 5 | | 0.0875 | F8 | |
| 6 | | 0.0000 | | |

| Example 15 | R (mm) | Thickness (mm) | Material | Semi-Diameter (mm) |
|---|---|---|---|---|
| 1 | | infinity | | |
| STO | | 0.0000 | | 1.200 |
| 3 | 0.91381 | 1.6000 | E48R | 1.206 |
| 4 | −1.85857 | 0.4828 | | 0.925 |
| 5 | | 0.0875 | F8 | |
| 6 | | 0.0000 | | |

| Example 16 | R (mm) | Thickness (mm) | Material | Semi-Diameter (mm) |
|---|---|---|---|---|
| 1 | | infinity | | |
| STO | | 0.0000 | | 1.200 |
| 3 | 0.92073 | 1.7000 | E48R | 1.206 |
| 4 | −1.62878 | 0.4353 | | 0.850 |
| 5 | | 0.0875 | F8 | |
| 6 | | 0.0000 | | |

| Example 17 | R (mm) | Thickness (mm) | Material | Semi-Diameter (mm) |
|---|---|---|---|---|
| 1 | | infinity | | 0.000 |
| STO | | 0.0000 | | |
| 3 | 0.92916 | 1.8000 | E48R | 1.200 |
| 4 | −1.41299 | 0.3901 | | 0.762 |
| 5 | | 0.0875 | F8 | |
| 6 | | 0.0000 | | |

| Example 18 | R (mm) | Thickness (mm) | Material | Semi-Diameter (mm) |
|---|---|---|---|---|
| 1 | | infinity | | |
| STO | | 0.0000 | | 1.200 |
| 3 | 0.93790 | 1.9000 | E48R | 1.200 |
| 4 | −1.21801 | 0.3460 | | 0.690 |
| 5 | | 0.0875 | F8 | |
| 6 | | 0.0000 | | |

TABLE 8

| Example 19 | R (mm) | Thickness (mm) | Material | Semi-Diameter (mm) |
|---|---|---|---|---|
| 1 | infinity | infinity | | |
| STO | infinity | 0.0000 | | 1.200 |
| 3 | 1.00280 | 1.1000 | OKP4HT | 1.200 |

TABLE 8-continued

| | | | | |
|---|---|---|---|---|
| 4 | −43.22347 | 0.7164 | | 1.085 |
| 5 | infinity | 0.0875 | F8 | |
| 6 | infinity | | | |

| Example 20 | R (mm) | Thickness (mm) | Material | Semi-Diameter (mm) |
|---|---|---|---|---|
| 1 | infinity | infinity | | |
| STO | infinity | 0.0000 | | 1.200 |
| 3 | 1.00292 | 1.2000 | OKP4HT | 1.200 |
| 4 | −39.61287 | 0.6585 | | 1.012 |
| 5 | infinity | 0.0875 | F8 | |
| 6 | infinity | 0.0000 | | |

| Example 21 | R (mm) | Thickness (mm) | Material | Semi-Diameter (mm) |
|---|---|---|---|---|
| 1 | infinity | infinity | | |
| STO | infinity | 0.0000 | | 1.200 |
| 3 | 1.00629 | 1.2500 | OKP4HT | 1.200 |
| 4 | −30.23465 | 0.6319 | | 0.976 |
| 5 | infinity | 0.0875 | F8 | |
| 6 | infinity | 0.0000 | | |

| Example 22 | R (mm) | Thickness (mm) | Material | Semi-Diameter (mm) |
|---|---|---|---|---|
| 1 | infinity | infinity | | |
| STO | infinity | 0.0000 | | 1.200 |
| 3 | 1.00468 | 1.3000 | OKP4HT | 1.200 |
| 4 | −32.06301 | 0.6018 | | 0.940 |
| 5 | infinity | 0.0875 | F8 | |
| 6 | infinity | 0.0000 | | |

TABLE 9

| Example 23 | R (mm) | Thickness (mm) | Material | Semi-Diameter (mm) |
|---|---|---|---|---|
| 1 | infinity | infinity | | |
| STO | infinity | 0.0000 | | 1.200 |
| 3 | 1.00959 | 1.4000 | OKP4HT | 1.205 |
| 4 | −22.07931 | 0.5479 | | 0.884 |
| 5 | infinity | 0.0875 | F8 | |
| 6 | infinity | 0.0000 | | |

| Example 24 | R (mm) | Thickness (mm) | Material | Semi-Diameter (mm) |
|---|---|---|---|---|
| 1 | infinity | infinity | | |
| STO | infinity | 0.0000 | | 1.200 |
| 3 | 1.01443 | 1.5000 | OKP4HT | 1.200 |
| 4 | −16.17038 | 0.4944 | | 0.804 |
| 5 | infinity | 0.0875 | F8 | |
| 6 | infinity | 0.0000 | F8 | |

| Example 25 | R (mm) | Thickness (mm) | Material | Semi-Diameter (mm) |
|---|---|---|---|---|
| 1 | infinity | infinity | | |
| STO | infinity | 0.0000 | | 1.200 |
| 3 | 1.02695 | 1.6000 | OKP4HT | 1.200 |
| 4 | −9.87938 | 0.4483 | | 0.743 |
| 5 | infinity | 0.0875 | F8 | |
| 6 | infinity | 0.0000 | | |

| Example 26 | R (mm) | Thickness (mm) | Material | Semi-Diameter (mm) |
|---|---|---|---|---|
| 1 | infinity | infinity | | |
| STO | infinity | 0.0000 | | 1.200 |
| 3 | 1.03641 | 1.7000 | OKP4HT | 1.200 |
| 4 | −7.17294 | 0.4005 | | 0.680 |
| 5 | infinity | 0.0875 | F8 | |
| 6 | infinity | 0.0000 | | |

Figure 5:
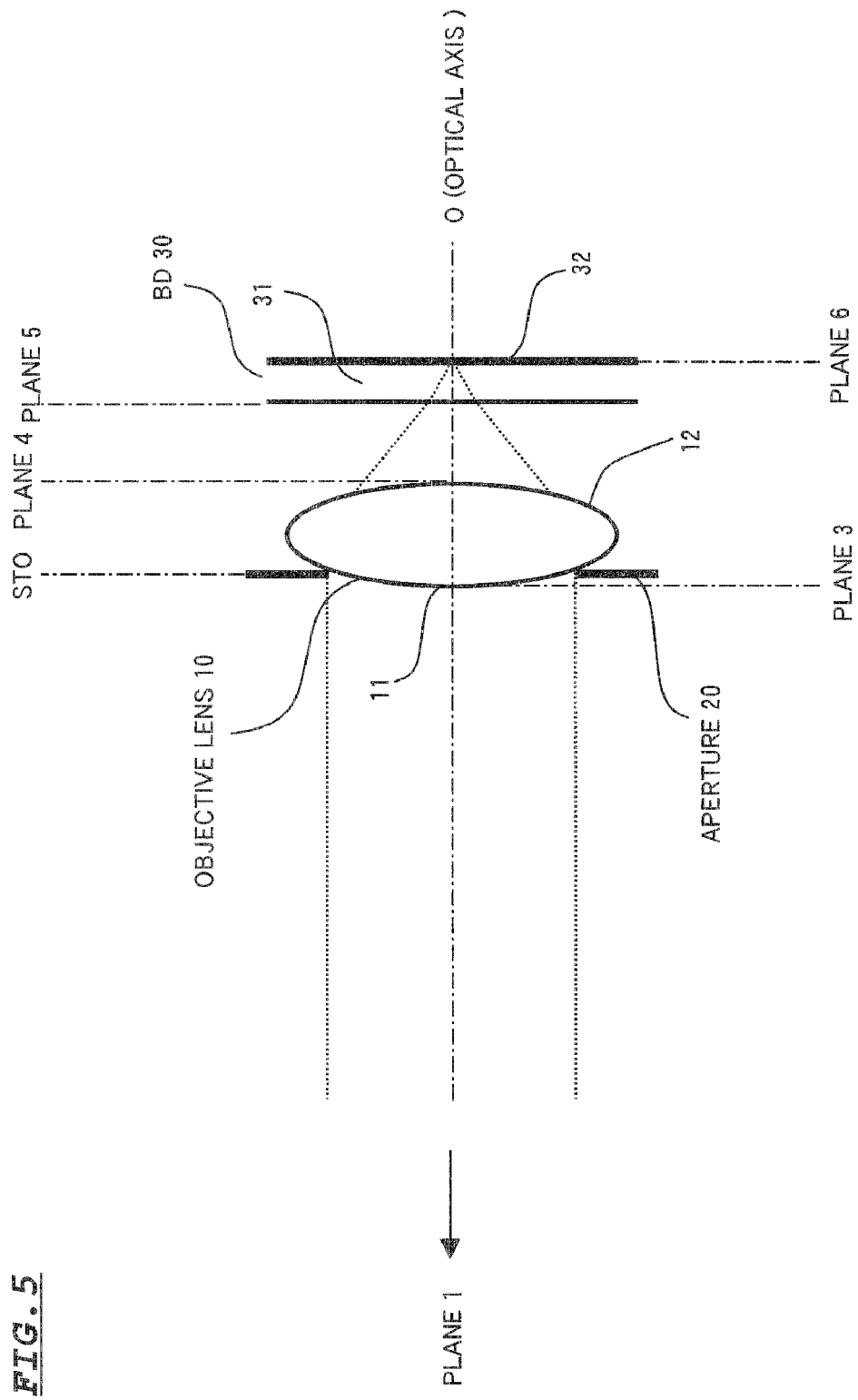
FIG. 5 is a diagram showing an objective lens and a surface configuration setting condition of an optical system in an inventive example.

Each example is described based on the premise that the optical system shown in FIG. 5 is used. The leftmost column in the table of each example shows the surface numbers. Further, the symbol "R" in each table indicates the curvature radius of each surface of an optical element, "Thickness" indicates a distance from each surface to a next surface, and "Semi-Diameter" indicates a radius of each surface of an optical element in a direction perpendicular to the optical axis. The surface number 1 indicates an output surface of a laser light source which emits BD light. In each example, since BD light is entered into the objective lens 10 as parallel light, the surface 1 is set at a point at infinity with respect to the objective lens 10. STO indicates a surface of an aperture 20 on the light incident side. The surface number 3 indicates a surface set at the optical axis position of the light-source-side lens surface 11 of the objective lens 10. The surface number 4 indicates a surface set at the optical axis position of the disc-side lens surface 12 of the objective lens 10. The surface number 5 indicates a surface of a cover layer 31 of BD 30. The surface number 6 indicates a surface of a recording layer 32 of the BD 30 on which BD light is irradiated.

The material composing the objective lens 10 in each example is indicated in the section of "Material" of the surface number 3. The objective lens 10 in each example is made of one of the materials shown in Tables 1 through 3. The material composing the cover layer 31 of the disc (BD) 30 is indicated in the section of "Material" of the surface number 5. The material composing the cover layer 31 is F8. F8 is a dummy cover glass to be used in a lens performance measuring apparatus. In the case where the material is actually used for a product, AD5503 or a like material is used.

In each example, the configurations of the light-source-side lens surface 11 and the disc-side lens surface 12 of the objective lens 10 are designed as shown in FIGS. 6 through 8. The configurations of the light-source-side lens surface 11 and the disc-side lens surface 12 are expressed by the following equation (2).

$$Z = \frac{(1/R)H^2}{1 + \sqrt{\{1 - (1 + K)(H/R)^2\}}} + A4H^4 + A6H^6 + A8H^8 + A10H^{10} + A12H^{12} + A14H^{14} + A16H^{16} \tag{2}$$

In the above equation (2), Z-axis is aligned with the optical axis direction. R is a curvature radius, and H is a height in a direction orthogonal to the optical axis. K is a conic constant, and corresponds to "Conic" in FIGS. 6 through 8. A4, A6, A8, A10, A12, A14 and A16 are respectively aspherical coefficients of 4-th order, 6-th order, 8-th order, 10-th order, 12-th order, 14-th order and 16-th order, and correspond to "A4" through "A16" in FIGS. 6 through 8.

Test Results

A test on light resistance was performed for the objective lens 10 in each example by using the optical system shown in FIG. 5. The test was performed with an ambient temperature of 35° C. and BD light of 405.6 nm in wavelength. The characteristics of each objective lens 10 were examined after incidence of BD light into the objective lens 10 in each example for 2,000 hours. The output of the laser light source was set to 1 mW. The 2,000 hours is known to be the life of a laser light source (a semiconductor laser).

FIGS. 9A through 9C show test results. FIG. 9A shows a test result of a group wherein the objective lens 10 is made of material AD5503, FIG. 9B shows a test result of a group wherein the objective lens 10 is made of material E48R, and FIG. 9C shows a test result of a group wherein the objective lens 10 is made of material OKP4HT.

"Center thickness" in FIGS. 9A through 9C indicates a thickness of an optical axis portion of the objective lens 10, and corresponds to "d" in FIG. 3. Further, "d'" and "d'''" in FIGS. 9A through 9C respectively correspond to "d'" and "d'''" in FIG. 3; and "f" in FIGS. 9A through 9C indicates a focal length of each objective lens 10. Further, "S1" and "S2" in FIGS. 9A through 9C respectively correspond to the projection area S1 of the light-source-side lens surface 11 and the projection area S2 of the disc-side lens surface 12 of each objective lens 10; and "S3" in FIGS. 9A through 9C corresponds to S3 in FIG. 4B. Furthermore, "Nh" in FIGS. 9A through 9C indicates Nh (a refractive index of an objective lens at a wavelength in use) in the equation (1). "Thickness difference ratio" in FIGS. 9A through 9C indicates a value obtained by dividing the thickness of the optical axis portion of each objective lens 10 by the thickness of an edge portion thereof, and corresponds to d/de in FIGS. 4A, 4B.

"Light resistance" and "degradation of center portion" in FIGS. 9A through 9C indicate test results, in the case where the test was performed in the above condition in each example.

"Light resistance" in FIGS. 9A through 9C was examined, based on a judgment as to whether the lowering rate of the transmittance (Tr1) of each objective lens 10 after irradiation of BD light for 2000 hours, to the initial transmittance (Tr0) has exceeded 10%. In the case where the lowering rate of the transmittance Tr1 to the transmittance Tr0 has exceeded 10%, it is judged that the objective lens 10 has been degraded, and the mark "x" is attached in FIGS. 9A through 9C. In the case where the lowering rate of the transmittance Tr1 to the transmittance Tr0 is 10% or smaller, it is judged that the objective lens 10 has not been degraded, and the mark "o" is attached in FIGS. 9A through 9C. The mark "⊚" shown in FIGS. 9A through 9C indicates that the lowering rate of the transmittance Tr1 to the transmittance Tr0 is 10% or smaller, even after irradiation of BD light for 3,000 hours, which exceeds 2,000 hours. The mark "Δ" in FIGS. 9A through 9C indicates that the lowering rate of the transmittance Tr1 to the transmittance Tr0 is around 10% (namely, the transmittance difference is substantially within the margin of error).

"Degradation of center portion" in FIGS. 9A through 9C was examined, based on a judgment as to whether a pillar-shaped degraded area was visually observed on the optical axis of each objective lens 10 after irradiation of BD light for 2,000 hours. In the case where a pillar-shaped degraded area was visually observed, the mark "x" is attached in FIGS. 9A through 9C. In the case where a pillar-shaped degraded area was not visually observed, but a pillar-shaped degraded area was dimly observed through a 10-power microscope, the mark "Δ" is attached in FIGS. 9A through 9C. In the case where a pillar-shaped degraded area was not observed even through a 10-power microscope, the mark "o" is attached in FIGS. 9A through 9C.

The inventor of the present application confirmed that the characteristics of the objective lens 10 are rapidly degraded in the case where the objective lens 10 is continued to be used after the lowering rate of the transmittance of the objective lens 10 has exceeded 10%. Based on the above finding, "light resistance" in FIGS. 9A through 9C was examined based on a judgment whether the lowering rate of the transmittance (Tr1) of each objective lens 10 to the initial transmittance (Tr0) has exceeded 10%.

Figure 10:
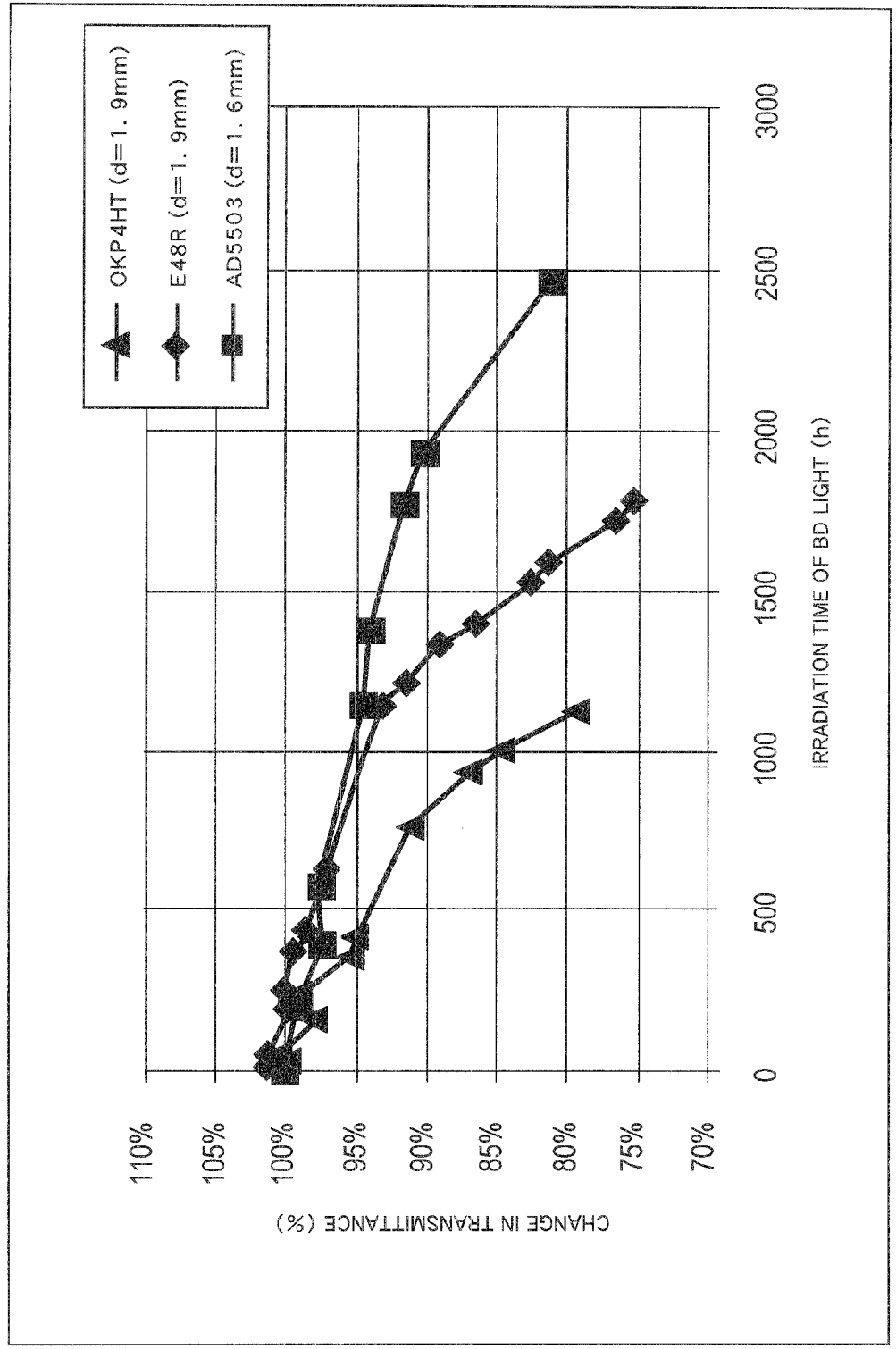
FIG. 10 is a diagram showing an index of light resistance of objective lenses to be applied to an experiment result.

FIG. 10 shows an experiment result indicating that the transmittance of the objective lens 10 is lowered, as the irradiation time of BD light is increased. The experiment was performed for three kinds of objective lens 10 each composed of a different material (AD5503, E48R, OKP4HT). The experiment result shows that the transmittance of the objective lens 10 is rapidly changed by continued irradiation of BD light after the lowering rate of the transmittance has exceeded 10%, in any of the cases. If the transmittance of the objective lens 10 is lowered, the characteristics of BD light to be irradiated onto BD are degraded, which resultantly increases an error rate of reading a signal from BD. In view of the above, it is desirable to keep the lowering rate of the transmittance of the objective lens 10 from exceeding 10%.

Based on the above experiment result, "light resistance" in the test results shown in FIGS. 9A through 9C was determined based on a judgment as to whether the lowering rate of the transmittance (Tr1) of each objective lens 10 to the initial transmittance (Tr0) has exceeded 10%.

In the following, each example is evaluated based on the test results shown in FIGS. 9A through 9C.

(1) Light Resistance

Referring to FIG. 9A, in the case where the material was AD5503, light resistance was good in examples 1 through 4. Therefore, in the case where the objective lens 10 is made of material AD5503, it is preferable to set the light collecting rate (the projection area ratio: S1/S2) substantially in the following range:

$$S1/S2 \leq 2.0 \quad (3)$$

Specifically, by configuring the light-source-side lens surface 11 and the disc-side lens surface 12 in such a manner as to set the light collecting rate (S1/S2) to 2.0 or smaller, it is possible to suppress the lowering rate of the transmittance of the objective lens 10 to 10% or smaller in the case where BD light is irradiated for 2,000 hours.

Referring to FIG. 9B, in the case where the material was E48R, light resistance was good in examples 9 through 15. Therefore, in the case where the objective lens 10 is made of material E48R, it is preferable to set the light collecting rate (S1/S2) substantially in the following range:

$$S1/S2 \leq 2.0 \quad (4)$$

Specifically, by configuring the light-source-side lens surface 11 and the disc-side lens surface 12 in such a manner as to set the light collecting rate (S1/S2) to 2.0 or smaller, it is possible to suppress the lowering rate of the transmittance of the objective lens 10 to 10% or smaller in the case where BD light is irradiated for 2,000 hours.

Referring to FIG. 9C, in the case where the material was OKP4HT, light resistance was substantially good in examples 19 through 23. Therefore, in the case where the objective lens 10 is made of material OKP4HT, it is preferable to set the light collecting rate (S1/S2) substantially in the following range:

$$S1/S2 \leq 2.0 \quad (5)$$

Specifically, by configuring the light-source-side lens surface 11 and the disc-side lens surface 12 in such a manner as to set the light collecting rate (S1/S2) to 2.0 or smaller, it is possible to suppress the lowering rate of the transmittance of the objective lens 10 to 10% or smaller in the case where BD light is irradiated for 2,000 hours.

Based on the test results shown in FIGS. 9A through 9B, it is possible to suppress the lowering rate of the transmittance of the objective lens 10 to 10% or smaller in the case where BD light is irradiated for 2,000 hours, even if material OKP4HT whose "light resistance" is weakest among the materials is used, as far as the light collecting rate (S1/S2) is kept to 2.0 or smaller. Thus, in the case where the objective lens 10 is made of a resin material, by configuring the lightsource-side lens surface 11 and the disc-side lens surface 12 at least to set the light collecting rate (S1/S2) to 2.0 or smaller, it is possible to suppress the lowering rate of the transmittance of the objective lens 10 to 10% or smaller in the case where BD light is irradiated for 2,000 hours to thereby prevent degradation of the precision in reading a signal from BD.

(2) Degradation of Center Portion

Referring to FIG. 9A, in the case where the material was AD5503, no degradation of a center portion was found in examples 1 through 3. Therefore, in the case where the objective lens 10 is made of material AD5503, it is preferable to set the projection area ratio (S3/S2) in the following range:

$$S3/S2 \geq 0.1 \quad (6)$$

Specifically, by configuring the light-source-side lens surface 11 and the disc-side lens surface 12 in such a manner as to set the projection area ratio (S3/S2) to 0.1 or larger, it is possible to avoid generation of a pillar-shaped degraded area on the optical axis.

Referring to FIG. 9B, in the case where the material was E48R, no degradation of a center portion was found in examples 9, 10, 12. Therefore, in the case where the objective lens 10 is made of material E48R, it is preferable to set the projection area ratio (S3/S2) in the following range:

$$S3/S2 \geq 0.1 \quad (7)$$

Specifically, by configuring the light-source-side lens surface 11 and the disc-side lens surface 12 in such a manner as to set the projection area ratio (S3/S2) to 0.1 or larger, it is possible to avoid generation of a pillar-shaped degraded area on the optical axis.

Referring to FIG. 9C, in the case where the material was OKP4HT, no degradation of a center portion was found in examples 19 through 23. Therefore, in the case where the objective lens 10 is made of material OKP4HT, it is preferable to set the projection area ratio (S3/S2) in the following range:

$$S3/S2 \geq 0.3 \quad (8)$$

Specifically, by configuring the light-source-side lens surface 11 and the disc-side lens surface 12 in such a manner as to set the projection area ratio (S3/S2) to 0.3 or larger, it is possible to avoid generation of a pillar-shaped degraded area on the optical axis.

Based on the test results shown in FIGS. 9A through 9B, there is no or less likelihood that a pillar-shaped degraded area may be visually observed on the optical axis, even if material OKP4HT which is most likely to cause "degradation of center portion" among the materials is used, as far as the projection area ratio (S3/S2) is kept to 0.3 or larger. Thus, in the case where the objective lens 10 is made of a resin material, by configuring the light-source-side lens surface 11 and the disc-side lens surface 12 at least to set the projection area ratio (S3/S2) to 0.3 or larger, it is possible to avoid generation of a pillar-shaped degraded area on the optical axis.

(3) Material for Objective Lens

Based on the test results shown in FIGS. 9A through 9B, in the case where the material is AD5503 or E48R, "degradation of center portion" is less likely to occur, as compared with a case where the material is OKP4HT. Therefore, it is preferable to use AD5503 or E48R as the material for the objective lens 10.

As is obvious from comparison between FIGS. 9A and 9B, material E48R is superior to material AD5503 in light resistance. In this aspect, it may be preferable to use E48R as the material for the objective lens 10.

However, as is obvious from comparison between tables 1 and 2, the refractive index of material AD5503 is higher than that of material E48R in the wavelength region of BD light. Accordingly, material AD5503 is advantageously used to satisfy the equation (1). Thus, it may be preferable to use AD5503 as the material for the objective lens 10 in the aspect of feasibility in designing a lens.

It is preferable to use a material whose refractive index Nh is 1.53 or larger in the wavelength region of BD light, in the case where a material whose refractive index (Nd=1.5 to 1.56) is substantially equal to the refractive index of material E48R is used, as the material for the objective lens 10. This is because if the refractive index Nh in the wavelength region of BD light is smaller than 1.53, it is difficult to satisfy the equation (1) and is difficult to design an intended lens due to the small refractive index Nh.

(4) Thickness Difference Ratio

It is desirable to minimize the thickness difference ratio to enhance the precision of transferring a surface configuration in molding a lens. As the projection of a lens surface is increased, it is difficult to transfer a surface configuration, which may lower the precision of transferring a surface configuration. Generally, in the case where the objective lens 10 is molded by injection molding, it is desirable to set the thickness difference ratio to 4 or smaller; and in the case where the objective lens 10 is molded by press molding, it is desirable to set the thickness difference ratio to 6 or smaller.

Figure 11:
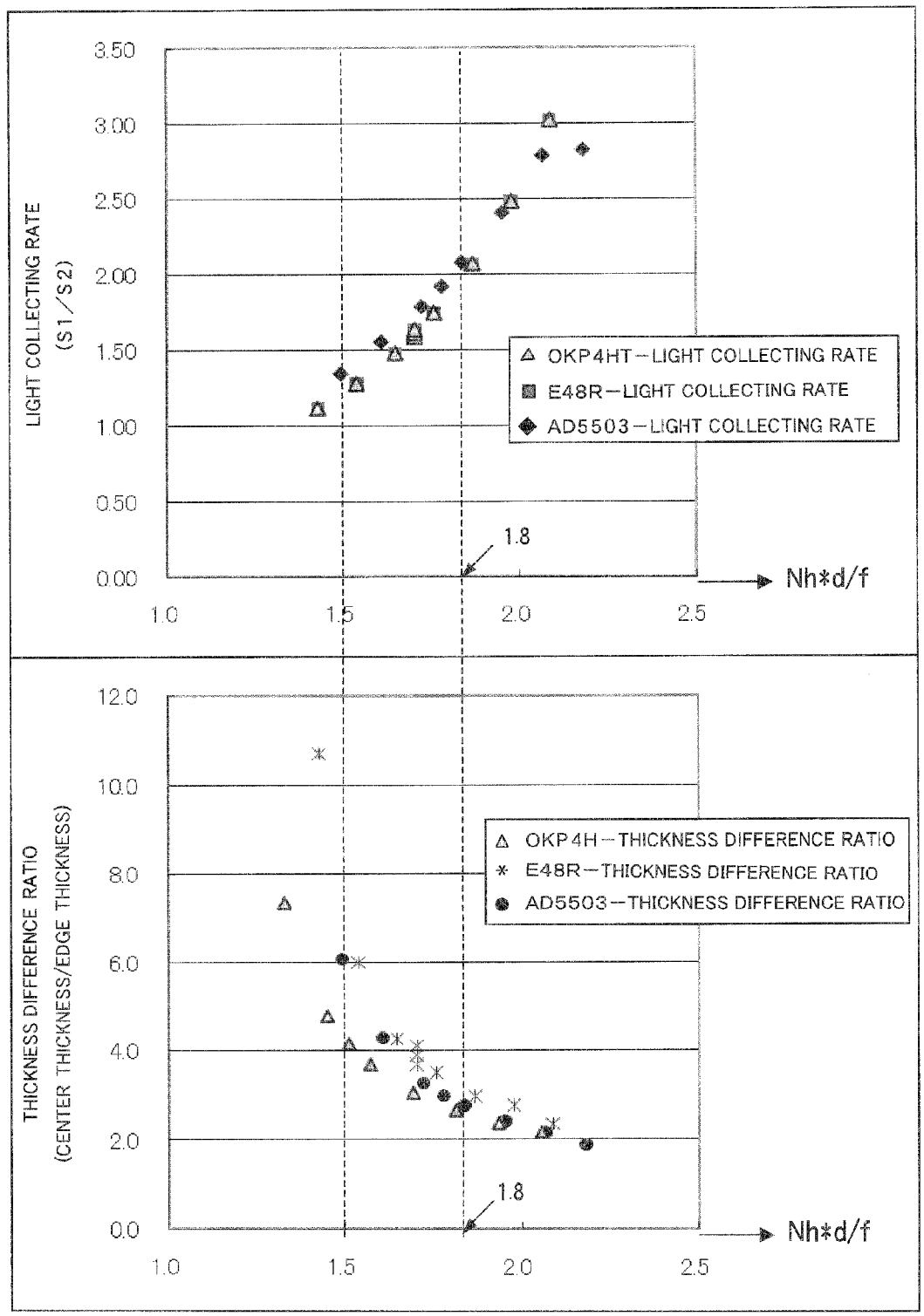
FIG. 11 is a diagram showing a proper range on the thickness difference ratio of objective lenses to be applied to the examples.

FIG. 11 is a graph showing the plotted values in each example, wherein the horizontal axis represents Nh·d/f, and the vertical axis represents a light collecting rate and a thickness difference ratio.

It is required to set the light collecting rate (S1/S2) to 2 or smaller in order to obtain satisfactory "light resistance". In order to satisfy the above condition, it is required to satisfy the following condition concerning Nh·d/f, based on the upper graph in FIG. 10.

$$Nh \cdot d/f \leq 1.8 \quad (9)$$

On the other hand, it is required to satisfy the following condition concerning Nh·d/f, based on the lower graph in FIG. 11, to set the thickness difference ratio to 6.0 or smaller in the aspect of the precision of transferring a surface configuration in molding the objective lens 10 by press molding.

$$Nh \cdot d/f \geq 1.5 \quad (10)$$

Thus, by designing the objective lens in such a manner as to satisfy the following equation (11), it is possible to obtain satisfactory "light resistance", while keeping the precision of transferring a surface configuration high in press molding.

$$1.5 \leq Nh \cdot d/f \leq 1.8 \quad (11)$$

Further, it is required to satisfy the following condition concerning Nh·d/f, based on the lower graph in FIG. 11, to set the thickness difference ratio to 4.0 or smaller in the aspect of the precision of transferring a surface configuration in molding the objective lens 10 by injection molding.

$$Nh \cdot d/f \geq 1.65 \quad (12)$$

Thus, by designing the objective lens in such a manner as to satisfy the following equation (13), it is possible to obtain satisfactory "light resistance", while keeping the precision of transferring a surface configuration high in injection molding.

$$1.65 \leq Nh \cdot d/f \leq 1.8 \quad (13)$$

It is required to set the value of Nh·d/f to 1.70 or smaller, based on the test results shown in FIGS. 9A through 9C, to suppress "degradation of center portion". In this case, the equations (11), (13) are read as follows.

$$1.5 \leq Nh \cdot d/f \leq 1.7 \quad (11')$$

$$1.65 \leq Nh \cdot d/f \leq 1.7 \quad (13')$$

By designing the objective lens according to the above equations, it is possible to obtain satisfactory "light resistance", "degradation of center portion" and "precision of transferring surface configuration".

The following advantages can be obtained by the aforementioned embodiment and examples.

(a) It is possible to suppress generation of a pillar-shaped degraded area on the optical axis in the objective lens 10 by configuring the light-source-side lens surface 11 and the disc-side lens surface 12 in such a manner that a part of a light collecting portion of BD light reflected on the disc-side lens surface 12 is guided to a position on the outside of the light-source-side lens surface 11.

In the above arrangement, it is possible to more effectively suppress generation of a pillar-shaped degraded area by configuring the optical pickup device to guide a condensing portion of laser light reflected on the projection area S3, which is an area from an outermost periphery of an incident area of laser light in the disc-side lens surface 12 toward an inner periphery thereof, when viewed from the optical axis direction, to a position on the outside of the light-source-side lens surface 11.

(b) It is possible to substantially suppress generation of a pillar-shaped degraded area by configuring the light-source-side lens surface 11 and the disc-side lens surface 12 in such a manner that the ratio between the projection areas S2 and S3 satisfies the formula: S3/S2≧0.3.

(c) The light-source-side lens surface 11 and the disc-side lens surface 12 may be configured to satisfy the equation (1) in order to suppress generation of a pillar-shaped degraded area.

(d) It is possible to suppress generation of a pillar-shaped degraded area, on the optical axis in the objective lens 10, by configuring the light-source-side lens surface 11 and the disc-side lens surface 12 in such a manner as to satisfy the formula: 1.5 Nh·d/f≦1.8. Further, by the above configuration, it is possible to enhance the precision of transferring a surface configuration of the lens surface in molding an objective lens 10 by press molding.

(e) It is possible to suppress generation of a pillar-shaped degraded area, on the optical axis in the objective lens, by configuring the light-source-side lens surface 11 and the disc-side lens surface 12 in such a manner as to satisfy the formula: 1.65≦Nh·d/f≦1.8. Further, it is possible to enhance the transfer precision of a lens surface also in molding the objective lens by injection molding.

MODIFICATION EXAMPLE 1

Figure 12:
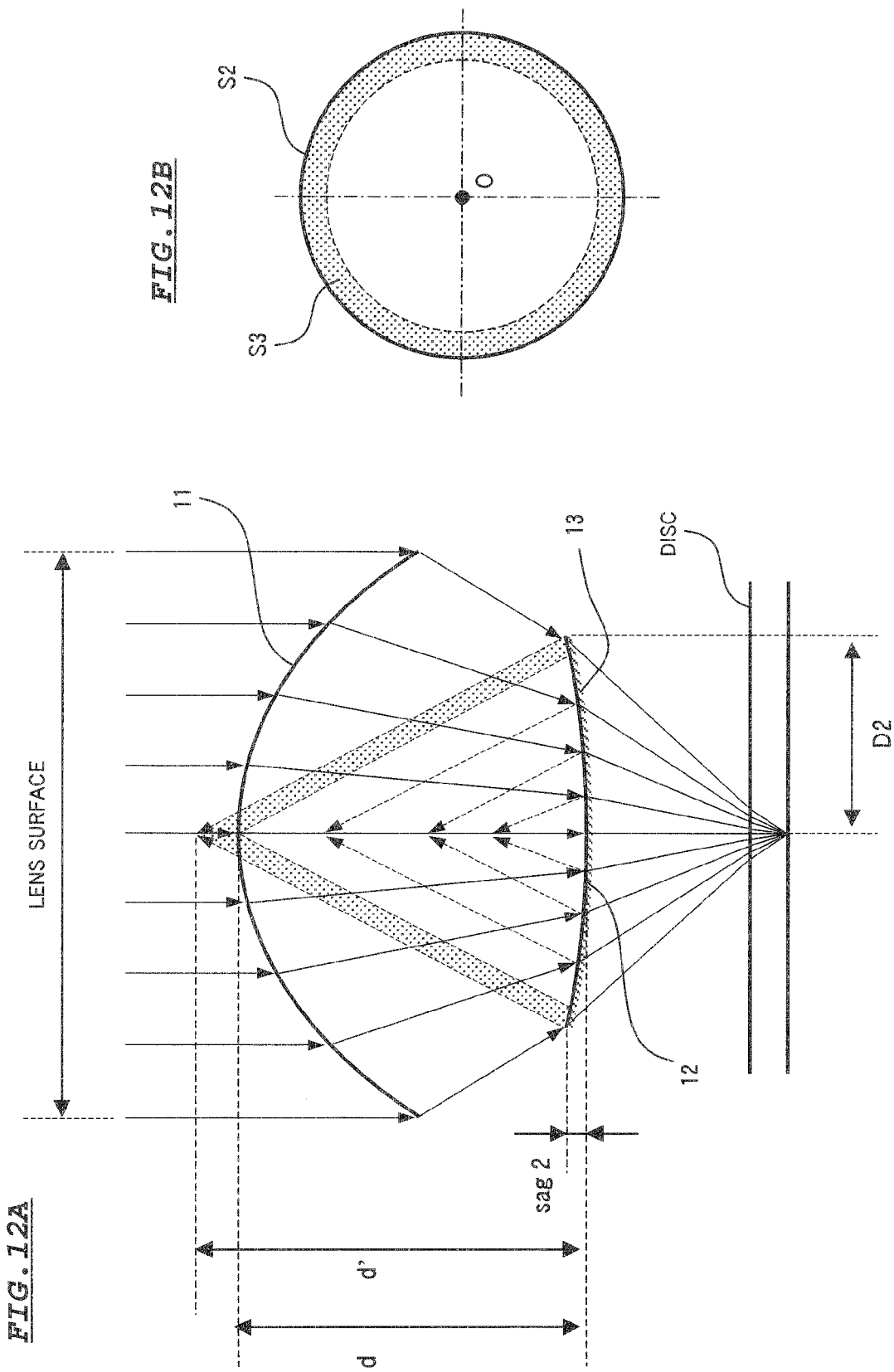
FIGS. 12A and 12B are diagrams showing an arrangement of a modification of the embodiment.

In addition to the above arrangement of the embodiment, it is possible to further suppress generation of a degraded area on the optical axis of the objective lens by adjusting the characteristics of an anti-reflection film 13 (see FIGS. 12A, 12B) formed on the disc-side lens surface 12.

Figure 13:
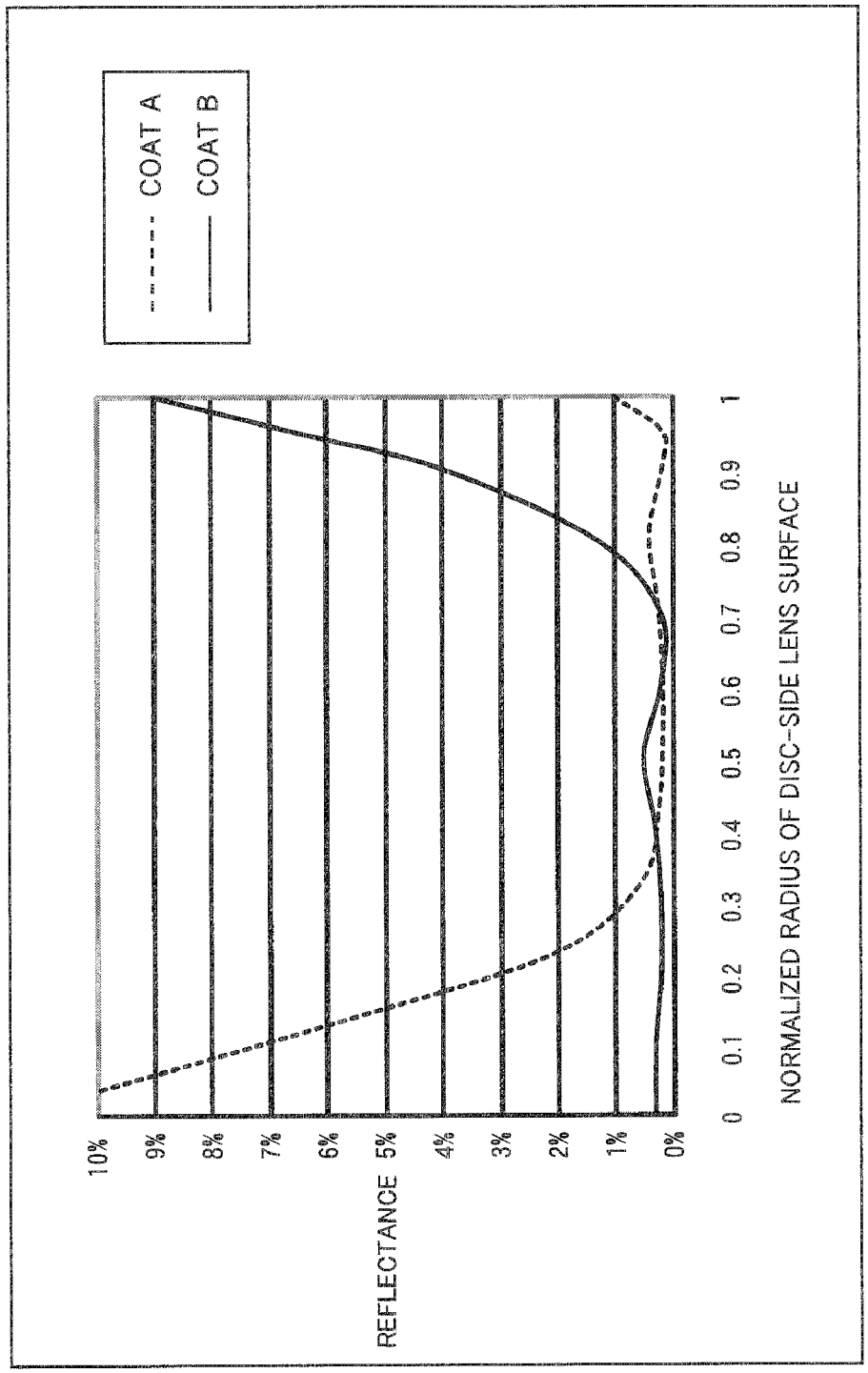
FIG. 13 is a diagram showing a characteristic of the anti-reflection film in the modification.

FIG. 13 is a diagram showing characteristics of an anti-reflection film. In FIG. 13, the horizontal axis represents a distance from an optical axis, and the vertical axis represents a reflectance of the anti-reflection film with respect to BD light. The horizontal axis is normalized, with a radial distance to the outermost periphery of the disc-side lens surface 12 being set to 1. In FIG. 13, "coat B" indicates characteristics of a conventional anti-reflection film, and "coat A" indicates characteristics an anti-reflection film of modification example 1.

As shown in FIG. 13, conventionally, the anti-reflection film 13 is formed in such a manner that the reflectance of a center portion of the objective lens 10 is lowered in order to transmit a larger amount of light in the center portion, where the light intensity of BD light is high. In this case, as shown in FIG. 13, the reflectance of the outer periphery of the objective lens 10 is increased, in the case where the anti-reflection film 13 is formed, in terms of a relationship with a film forming process. As a result, it may be difficult to suppress reflection on the outer periphery of the disc-side lens surface 12, where reflection is inherently likely to occur in terms of a relationship with an incident angle, by the anti-reflection film 13. Thus, degradation by collecting reflected light is likely to occur on the optical axis of the objective lens 10.

In contrast, as shown in FIG. 13, in modification example 1, the anti-reflection film 13 is formed in such a manner as to reduce the reflectance on the outer periphery of the objective lens 10. With this arrangement, it is possible to suppress reflection on the outer periphery of the disc-side lens surface 12, where reflection is inherently likely to occur in terms of a relationship with an incident angle, by the anti-reflection film 13. As a result, there is no or less likelihood that degradation by collecting reflected light may occur on the optical axis of the objective lens 10.

As shown in FIG. 13, forming the anti-reflection film 13 as described above increases the reflectance of a center portion of the disc-side lens surface 12. However, since the incident angle of a light ray is small at the center portion of the disc-side lens surface 12, reflection is less likely to occur. Thus, even if the reflectance of the center portion of the disc-side lens surface 12 is increased, attenuation of BD light by reflection on the center portion is not seriously increased.

As described above, modification example 1 is further advantageous in suppressing degradation by collecting reflected light.

MODIFICATION EXAMPLE 2

In modification example 1, the characteristics of the anti-reflection film 13 are adjusted. In modification example 2, an anti-oxidation film is formed between the disc-side lens surface 12 and the anti-reflection film 13.

Degradation of the disc-side lens surface 12 by irradiation of BD light occurs in the presence of oxygen. In modification example 2, an anti-oxidation film is formed on a surface of the disc-side lens surface 12 by vapor deposition. With this arrangement, oxygen permeation through the disc-side lens surface 12 is blocked, thereby suppressing degradation of the disc-side lens surface 12.

The anti-oxidation film is formed by depositing e.g. a mixture of $Al_2O_3$ and $SiO_2$ by vapor deposition.

Optical Pickup Device

Figure 14B:
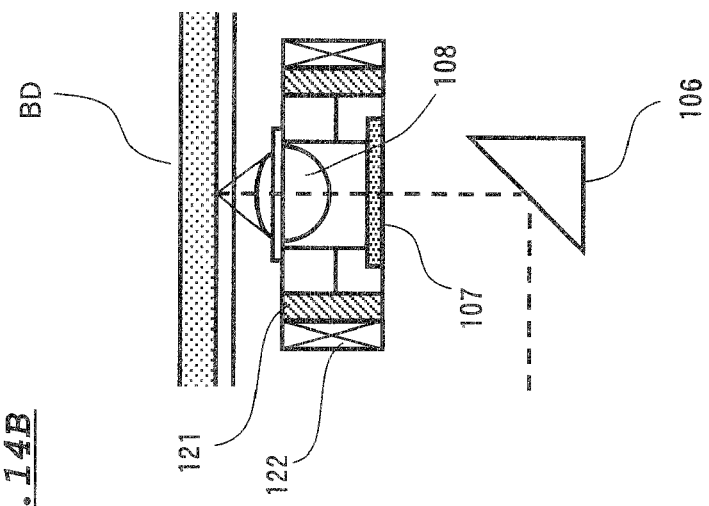
FIGS. 14A and 14B are diagrams showing an arrangement of an optical pickup device embodying the invention.
Figure 14A:
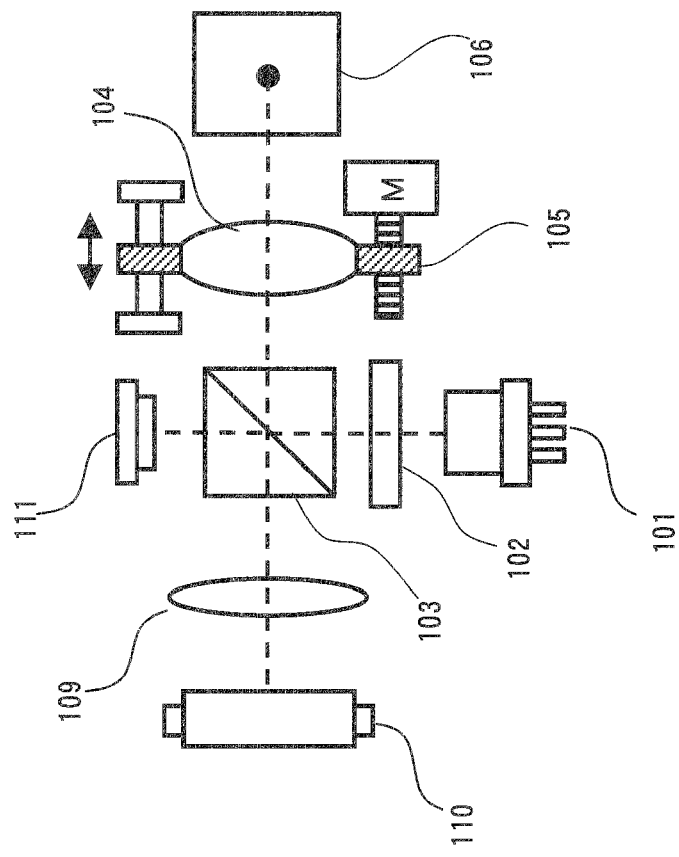

FIGS. 14A, 14B illustrate an arrangement of an optical system (an optical system for BD) of an optical pickup device loaded with the objective lens 10 designed based on the embodiment.

The optical system for BD is constituted of a semiconductor laser 101, a diffraction grating 102, a polarized beam splitter 103, a collimator lens 104, a lens actuator 105, a rise-up mirror 106, a quarter wave plate 107, a first objective lens 108, an anamorphic lens 109, a photodetector 110, and an Front Monitor Diode (FMD) 111.

The semiconductor laser 101 outputs blue laser light of a wavelength of or about 400 nm. The diffraction grating 102 divides laser light emitted from the semiconductor laser 101 into a main beam and two sub beams. The polarized beam splitter 103 reflects and transmits laser light entered from the side of the diffraction grating 102. The semiconductor laser 101 is disposed at such a position that the polarization direction of emitted laser light is slightly displaced from a polarization direction of S-polarized light with respect to the polarized beam splitter 103. With this arrangement, for instance, 95% of laser light transmitted through the diffraction grating 102 is reflected on the polarized beam splitter 103, and the remaining 5% thereof is transmitted through the polarized beam splitter 103.

The collimator lens 104 converts laser light reflected on the polarized beam splitter 103 into parallel light. The lens actuator 105 drives the collimator lens 104 in the optical axis direction of laser light. The collimator lens 104 and the lens actuator 105 function as aberration correcting means.

The rise-up mirror 106 reflects laser light entered through the collimator lens 104 in a direction toward the objective lens 108. The quarter wave plate 107 converts laser light reflected on the reflection mirror 106 into circularly polarized light, and converts reflected light on a disc (BD) into a linearly polarized light in a direction orthogonal to the polarization direction of light toward the disc. With this arrangement, laser light reflected on the disc is guided to the photodetector 110 through the polarized beam splitter 103.

As described above, the objective lens 108 is designed to obtain satisfactory "light resistance", "degradation of center portion" and "precision of transferring surface configuration". The objective lens 108 properly converges laser light in a blue wavelength region on a signal plane of BD with a predetermined numerical aperture NA. Specifically, the first objective lens 108 is designed to properly converge laser light in a blue wavelength region on a signal plane through a cover layer of 0.1 mm in thickness.

The anamorphic lens 109 converges laser light reflected on a disc onto the photodetector 110. The photodetector 110 has a sensor pattern for deriving a reproduction RF signal, a focus error signal, and a tracking error signal, based on an intensity distribution of received laser light. In this embodiment, an astigmatism method is adopted as a focus error signal generation method, and a Differential Push Pull (DPP) method is adopted as a tracking error signal generation method. The photodetector 110 has a sensor pattern for deriving a focus error signal and a tracking error signal according to these methods.

The FMD 111 receives laser light transmitted through the polarized beam splitter 103, and outputs a signal in accordance with a received light amount. The signal from the FMD 111 is used for power control of the semiconductor laser 101.

According to the optical pickup device having the above arrangement, it is possible to maintain the characteristics of the objective lens 108 high, even if the optical pickup device is used until the life (about 2,000 hours) of the semiconductor laser 101 is ended. Thus, it is possible to suppress a reading error of a signal to thereby realize smooth recording/reproducing operations.

The embodiment of the invention and the advantages thereof have been described as above. The invention is not limited to the foregoing embodiment, and the embodiment of the invention may be modified in various ways other than the above.

For instance, in the embodiment, the present invention is applied to an objective lens for BD. Alternatively, the present invention may be applied to other objective lens for e.g. HD.

Further, the arrangement of the optical pickup device is not limited to the one shown in FIGS. 14A, 14B. Alternatively, the present invention may be applied to an optical pickup device compatible with CD/DVD/BD. Further alternatively, the present invention may be applied to an optical pickup device for irradiating laser light onto a magneto-optical disk, and to an objective lens to be loaded in the optical pickup device.

Figure 15:
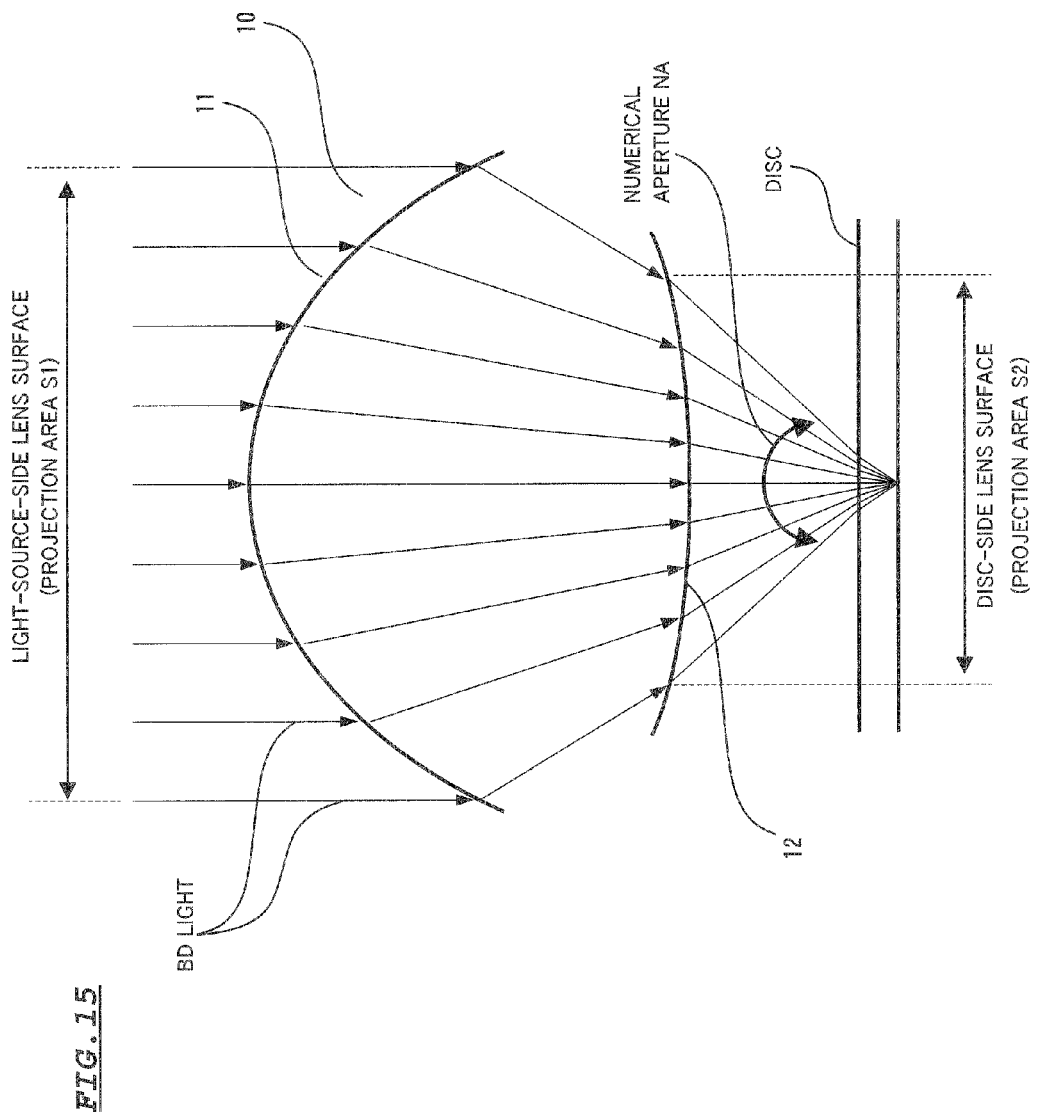
FIG. 15 is a diagram for describing another method for setting projection areas of the light-source-side lens surface and the disc-side lens surface in the embodiment.

In FIG. 2, the projection areas S1, S2 are defined with respect to the entirety of the light-source-side lens surface 11 and the entirety of the disc-side lens surface 12. For instance, as shown in FIG. 15, in the case where light rays of BD light to be converged on BD with a predetermined numerical aperture NA pass through a part of the light-source-side lens surface 11 or through a part of the disc-side lens surface 12, the projection areas on the light-source-side lens surface 11 and the disc-side lens surface 12 through which the light rays pass, when viewed from the optical axis direction, are respectively defined as the projection areas S1, S2.

The embodiment of the invention may be changed or modified in various ways as necessary, as far as such changes and modifications do not depart from the scope of the claims of the invention hereinafter defined.

What is claimed is:

1. An objective lens for an optical pickup device, comprising:
    a first lens surface by which laser light is converged, the first lens surface being a convex surface; and
    a second lens surface by which the laser light converged by the first lens surface is converged, the second lens surface being a convex surface, wherein
    the laser light reflected on the second lens surface and directed to the first lens surface is collected to a light collecting portion,
    the first lens surface and the second lens surface are configured to guide a part of the light collecting portion to a position on an outside of the first lens surface.

2. The objective lens for an optical pickup device according to claim 1, wherein
    a part of the light collecting portion to which the laser light reflected on a projection area S3 is collected is guided to a position on the outside of the first lens surface, the projection area S3 being an area from an outermost periphery of an entering area of the laser light in the second lens surface toward an inner periphery thereof, when viewed from an optical axis direction of the objective lens.

3. The objective lens for an optical pickup device according to claim 2, wherein
    the first lens surface and the second lens surface are configured to satisfy the following formula concerning a ratio between a projection area S2 and the projection area S3, the projection area S2 being an area of the second lens surface when the second lens is viewed from the optical axis direction:

$S3/S2 \geq 0.3$.

4. An objective lens for an optical pickup device, comprising:
    a first lens surface by which laser light is converged, the first lens surface being a convex surface; and
    a second lens surface by which the laser light converged by the first lens surface is converged, the second lens surface being a convex surface, wherein
    the laser light reflected on the second lens surface and directed to the first lens surface is collected to a light collecting portion,
    the first lens surface and the second lens surface are configured to guide a part of the light collecting portion to a position on an outside of the first lens surface, wherein the first lens surface and the second lens surface are configured to satisfy the following formula:

$$d < D2 \cdot \tan(90 - \theta1 + \text{Arc}\sin(\sin\theta1/Nh) - 2\cdot\theta2) + sag2$$

where

θ1: an incident angle of a light ray of laser light on the first lens surface, in the case where the light ray of the laser light is converged by the objective lens with a predetermined numerical aperture, θ2: an output angle of the light ray of the laser light on the second lens surface, in the case where the light ray of the laser light is converged by the objective lens with the numerical aperture, Nh: a refractive index of the objective lens at a wavelength in use, D2: a radius of an entering area of the light ray of the laser light in the second lens surface, in the case where the light ray of the laser light is converged by the objective lens with the numerical aperture, sag2: a sag amount of the second lens surface, in the case where the light ray of the laser light is converged by the objective lens with the numerical aperture, and d: a center thickness of the objective lens.

5. The objective lens for an optical pickup device according to claim 1, wherein
the first lens surface and the second lens surface are configured to satisfy the following formula:

$$1.5 \leq Nh \cdot d/f \leq 1.8$$

where
Nh is a wavelength of the laser light,
d is a center thickness of the objective lens, and
f is a focal length of the objective lens.

6. The objective lens for an optical pickup device according to claim 1, wherein
the first lens surface and the second lens surface are configured to satisfy the following formula:

$$1.65 \leq Nh \cdot d/f \leq 1.8$$

where
Nh is a wavelength of the laser light,
d is a center thickness of the objective lens, and
f is a focal length of the objective lens.

7. The objective lens for an optical pickup device according to claim 1, wherein
an anti-reflection film is formed on the second lens surface, and
the anti-reflection film is formed in such a manner as to lower a reflectance with respect to the laser light at an outer periphery of the second lens surface than at an inner periphery thereof.

8. The objective lens for an optical pickup device according to claim 1, wherein
an anti-oxidation film is formed on the second lens surface.

9. An optical pickup device, comprising:
a laser light source; and
an objective lens which converges laser light emitted from the laser light source on a disc,
the objective lens including
a first lens surface by which the laser light is converged, the first lens surface being a convex surface, and
a second lens surface by which the laser light converged by the first lens surface is converged, the second lens surface being a convex surface, wherein
the laser light reflected on the second lens surface and directed to the first lens surface is collected to a light collecting portion,
the first lens surface and the second lens surface are configured to guide a part of the light collecting portion to a position on an outside of the first lens surface.

10. The optical pickup device according to claim 9, wherein
a part of the light collecting portion to which the laser light reflected on a projection area S3 is collected is guided to a position on the outside of the first lens surface, the projection area S3 being an area from an outermost periphery of an entering area of the laser light in the second lens surface toward an inner periphery thereof, when viewed from the optical axis direction.

11. The optical pickup device according to claim 10, wherein
the first lens surface and the second lens surface are configured to satisfy the following formula concerning a ratio between a projection area S2 and the projection area S3, the projection area S2 being an area of the second lens surface when the second lens is viewed from the optical axis direction of the objective lens:

$$S3/S2 \geq 0.3.$$

12. An optical pickup device, comprising:
a laser light source; and
an objective lens which converges laser light emitted from the laser light source on a disc,
the objective lens including
a first lens surface by which the laser light is converged, the first lens surface being a convex surface, and
a second lens surface by which the laser light converged by the first lens surface is converged, the second lens surface being a convex surface, wherein
the laser light reflected on the second lens surface and directed to the first lens surface is collected to a light collecting portion,
the first lens surface and the second lens surface are configured to guide a part of the light collecting portion to a position on an outside of the first lens surface,
wherein
the first lens surface and the second lens surface are configured to satisfy the following formula:

$$d < D2 \cdot \tan(90 - \theta1 + \text{Arc}\sin(\sin\theta1/Nh) - 2\cdot\theta2) + sag2$$

where
θ1: an incident angle of a light ray of laser light on the first lens surface, in the case where the light ray of the laser light is converged by the objective lens with a predetermined numerical aperture,
θ2: an output angle of the light ray of the laser light on the second lens surface, in the case where the light ray of the laser light is converged by the objective lens with the numerical aperture,
Nh: a refractive index of the objective lens at a wavelength in use,
D2: a radius of an entering area of the light ray of the laser light in the second lens surface, in the case where the light ray of the laser light is converged by the objective lens with the numerical aperture,
sag2: a sag amount of the second lens surface, in the case where the light ray of the laser light is converged by the objective lens with the numerical aperture, and
d: a center thickness of the objective lens.

13. The optical pickup device according to claim 9, wherein
the first lens surface and the second lens surface are configured to satisfy the following formula:

$$1.5 \leq Nh \cdot d/f \leq 1.8$$

where
Nh is a wavelength of the laser light,
d is a center thickness of the objective lens, and
f is a focal length of the objective lens.

14. The optical pickup device according to claim 9, wherein
the first lens surface and the second lens surface are configured to satisfy the following formula:

$$1.65 \leq Nh \cdot d/f \leq 1.8$$

where
Nh is a wavelength of the laser light,
d is a center thickness of the objective lens, and
f is a focal length of the objective lens.

15. The optical pickup device according to claim 9, wherein
an anti-reflection film is formed on the second lens surface, and
the anti-reflection film is formed in such a manner as to lower a reflectance with respect to the laser light at an outer periphery of the second lens surface than at an inner periphery thereof.

16. The optical pickup device according to claim 9, wherein
an anti-oxidation film is formed on the second lens surface.

* * * * *